United States Patent
Liu et al.

(10) Patent No.: US 10,418,847 B2
(45) Date of Patent: Sep. 17, 2019

(54) LED EMERGENCY LIGHTING

(71) Applicant: Fulham Company Limited, George Town, Grand Cayman (KY)

(72) Inventors: Shiyu Liu, Shanghai (CN); Alvaro Garcia, La Habra, CA (US); Zhihua Jian, Beijing (CN); Duoping Wang, Shanghai (CN)

(73) Assignee: FULHAM COMPANY LIMITED, George Town, Grand Cayman (KY)

( * ) Notice: Subject to any disclaimer, the term of this patent is extended or adjusted under 35 U.S.C. 154(b) by 1 day.

(21) Appl. No.: 15/145,704

(22) Filed: May 3, 2016

(65) Prior Publication Data

US 2017/0051886 A1    Feb. 23, 2017

Related U.S. Application Data

(60) Provisional application No. 62/156,316, filed on May 3, 2015.

(51) Int. Cl.
*H02J 9/02* (2006.01)
*H02J 9/06* (2006.01)
*H05B 33/08* (2006.01)
*H05B 37/02* (2006.01)

(52) U.S. Cl.
CPC .............. *H02J 9/02* (2013.01); *H02J 9/065* (2013.01); *H05B 33/0815* (2013.01); *H05B 33/0842* (2013.01); *H05B 33/0851* (2013.01); *H05B 37/0227* (2013.01); *Y02P 80/11* (2015.11)

(58) Field of Classification Search
CPC ........ H02J 9/02; H02J 9/065; H05B 33/0815; H05B 33/0842; H05B 33/0845; H05B 33/0851; H05B 33/089
USPC ....................................... 307/23; 315/86, 87
See application file for complete search history.

(56) References Cited

U.S. PATENT DOCUMENTS

| | | | |
|---|---|---|---|
| 6,285,132 B1* | 9/2001 | Conley, III | H02J 9/02 315/129 |
| 2013/0147351 A1* | 6/2013 | Trainor | H02J 9/065 315/86 |
| 2014/0240966 A1* | 8/2014 | Garcia | H02J 7/0086 362/183 |

\* cited by examiner

*Primary Examiner* — Tomi Skibinski
(74) *Attorney, Agent, or Firm* — Womble Bond Dickinson (US) LLP

(57) ABSTRACT

A driver for a lighting device includes: a lighting driver configured to drive LED(s) of the lighting device in a first mode of operation when a primary power source is available and provided to the lighting driver and to control power output and/or final output current utilizing a backup or other secondary power source during an emergency mode of operation. In example embodiments and implementations, the lighting driver includes a single instance of a LED driver (e.g., only one LED driver circuit) configured to drive LED(s) of the lighting device during both modes of operation.

16 Claims, 41 Drawing Sheets

EM Circuit

40C Software Flowchart–Overall function
—normalwork()

40C Software Flowchart–Overall function–normalwork()

40C Software Flowchart-Emergency control function—emergmode()

40C Software Flowchart-Emergency control function--emergmode()

40C Software Flowchart-Check Hardware Mode Function
---HwSetDimLevel()

40C Software Flowchart-Dimming Function
---Dimminglamp()

40C Software Flowchart-Uart Communication Function
--SetCtrl()

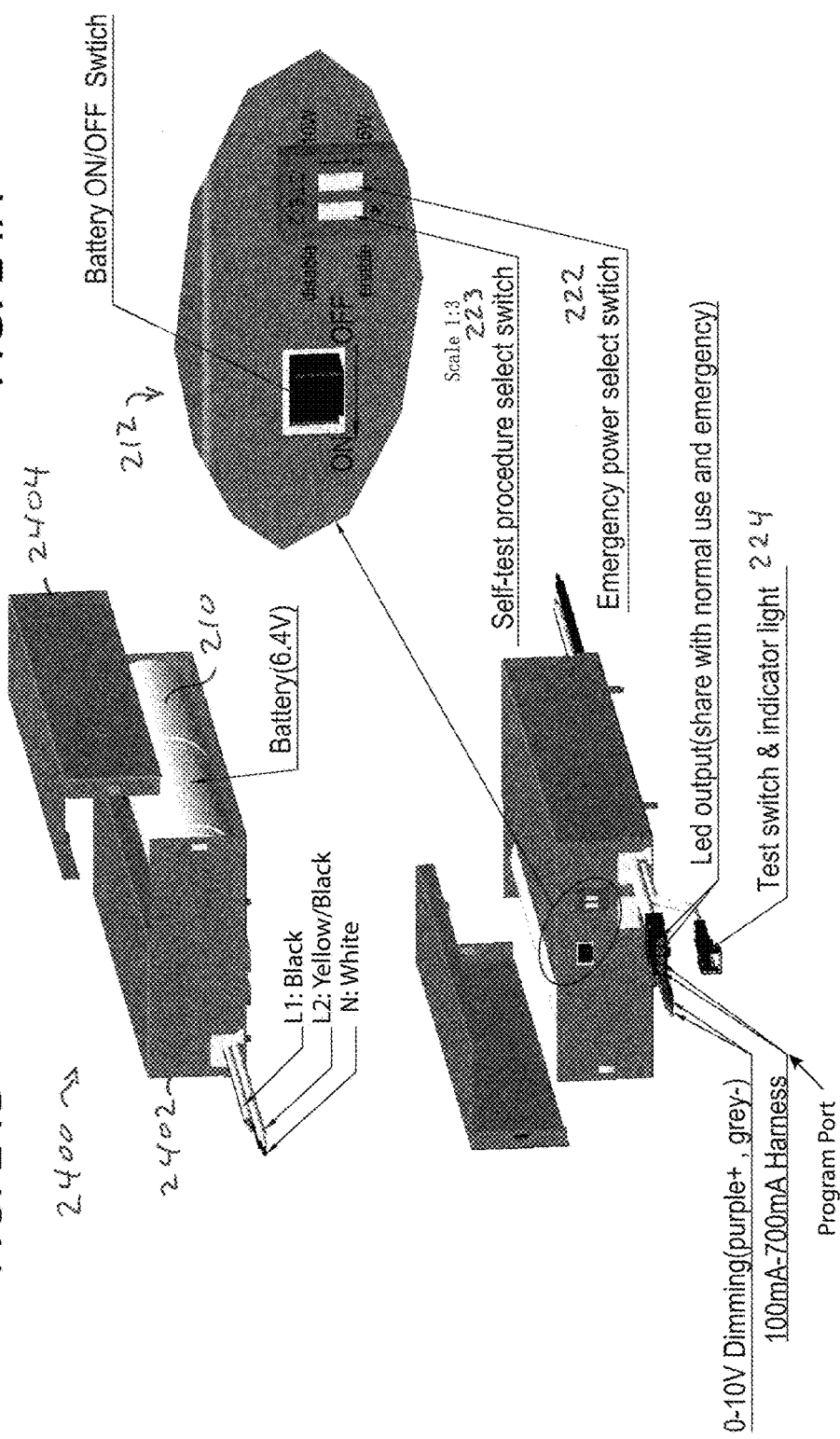

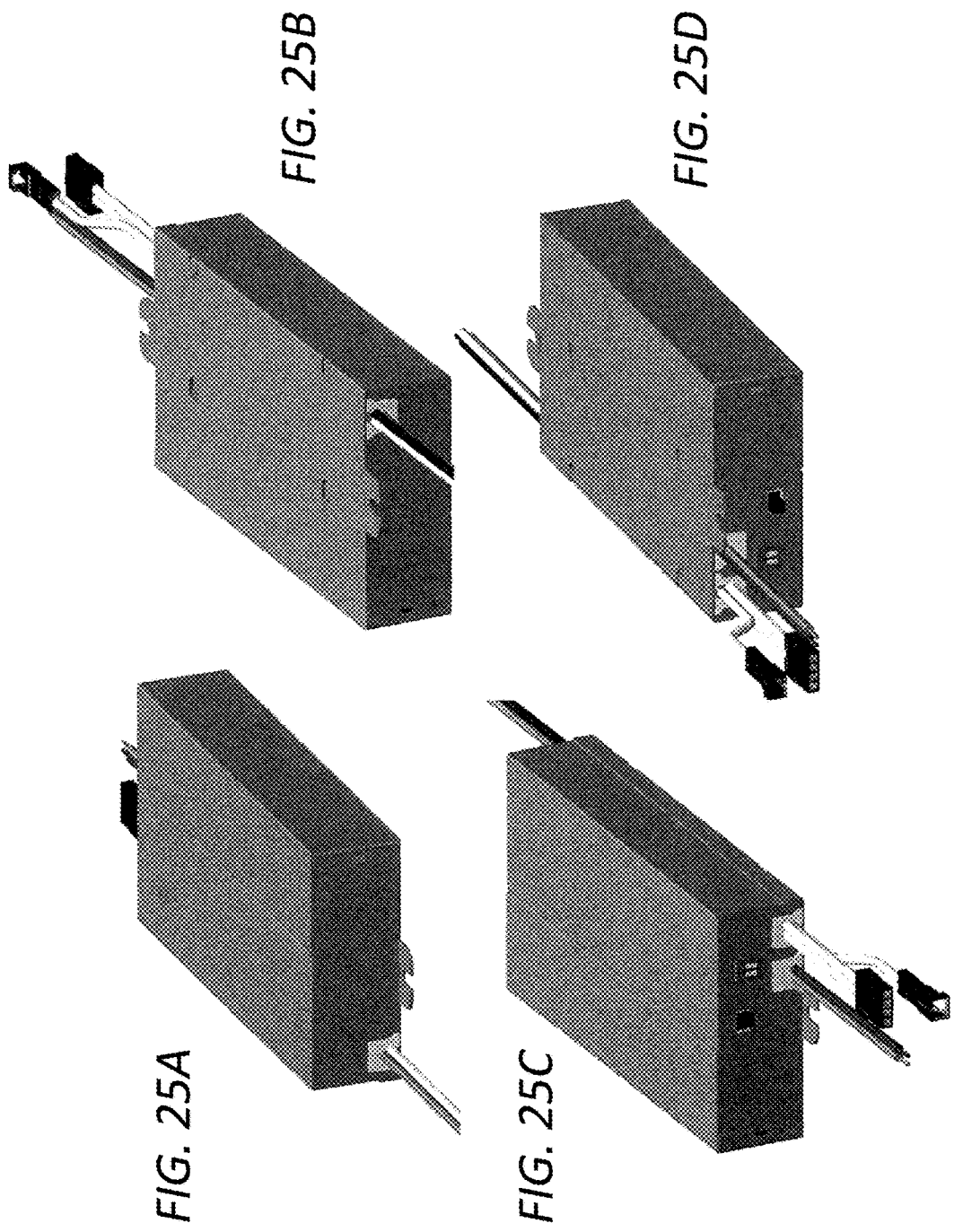

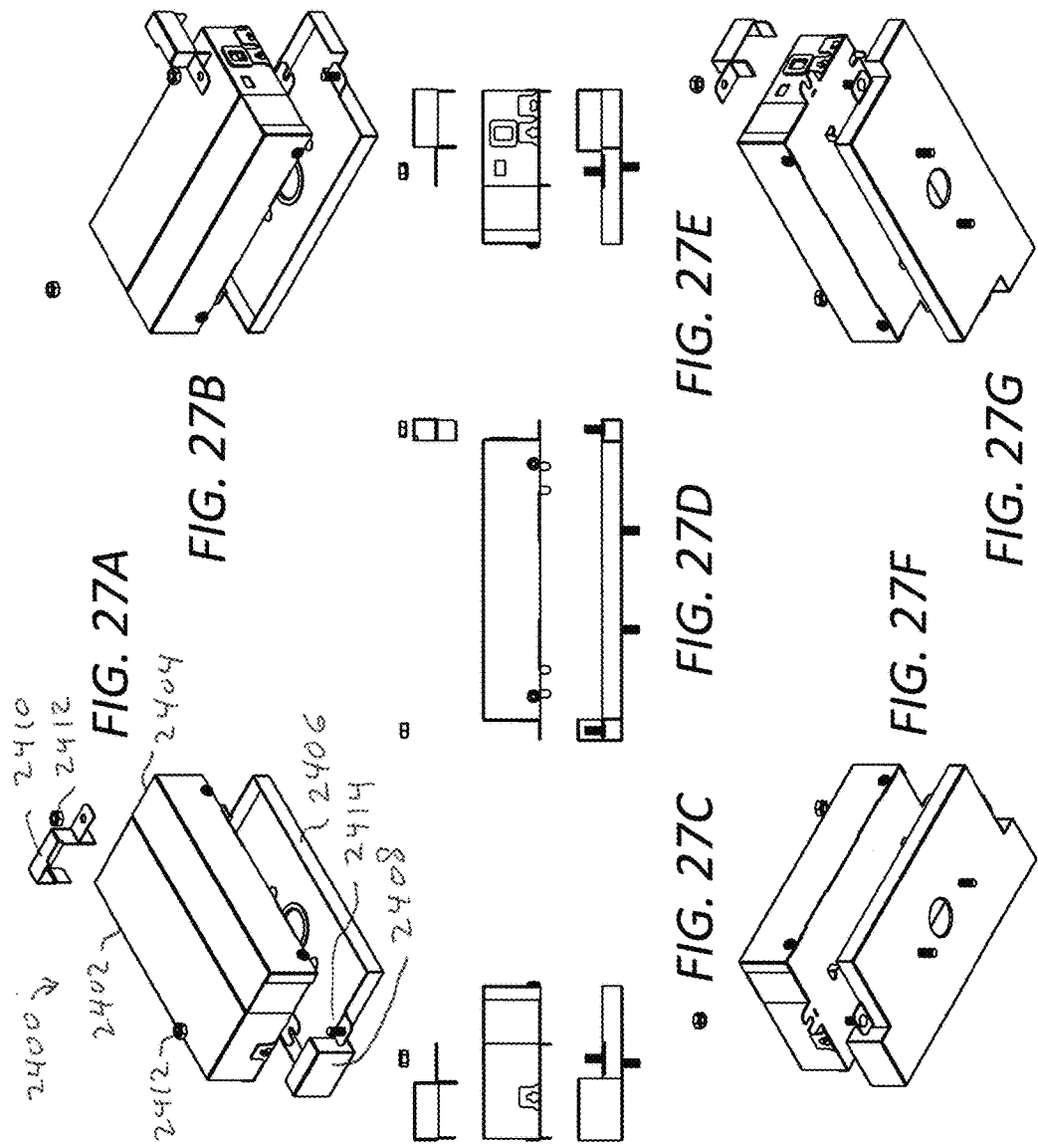

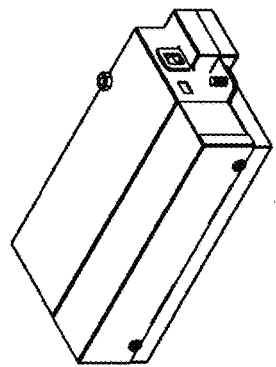
FIG. 29A
FIG. 29B
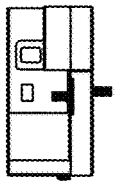
FIG. 29E
FIG. 29D
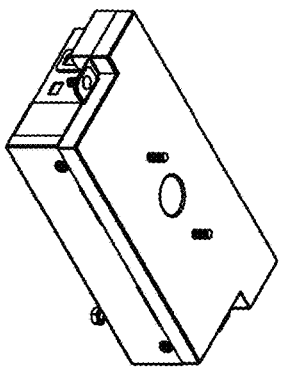
FIG. 29G
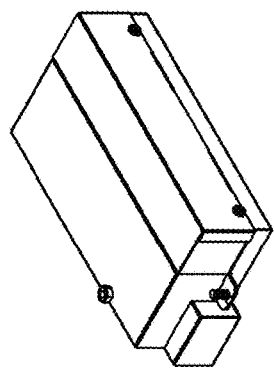
FIG. 29C
FIG. 29F
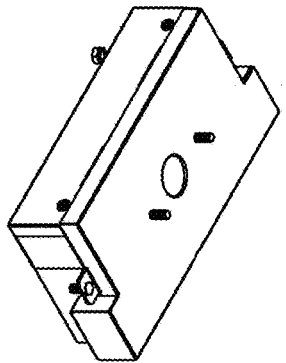

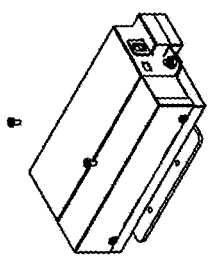
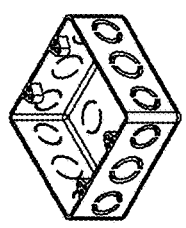
FIG. 31A
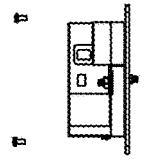
FIG. 31B
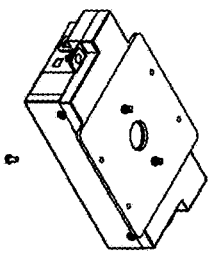
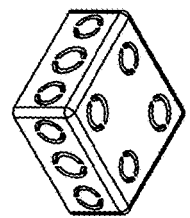
FIG. 31C

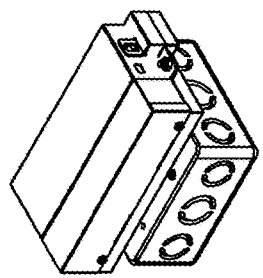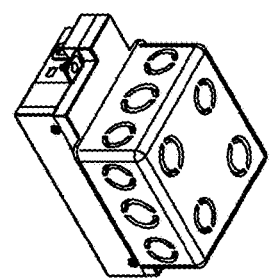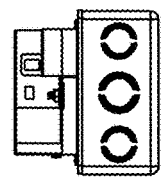
FIG. 32A
FIG. 32B
FIG. 32C

LED EMERGENCY LIGHTING

CROSS-REFERENCE TO RELATED APPLICATIONS

This application claims priority from U.S. provisional Application No. 62/156,316, filed on May 3, 2015, which is hereby incorporated by reference.

TECHNICAL FIELD

The present invention relates generally to lighting and lighting systems and devices and, in particular, light emitting diode (LED) drivers.

BACKGROUND ART

A great variety of lighting devices—including LED lamps—are known, as are drivers (e.g., driver circuits) for such devices.

Various battery backup devices are also known. Also, it is known to provide a ballast with battery backup. See e.g., WO2013179134 A1.

It would be useful to be able to provide a LED lighting driver (such as, for example, a LED lighting driver capable of providing normal and emergency illumination in a luminaire) that facilitates one or more of improved, advantageous, or otherwise desirable or useful qualities, functionalities and/or performance and/or technologies/methodologies providing of beneficial features.

SUMMARY OF THE INVENTION

In an example embodiment, a driver for a lighting device including at least one light emitting diode (LED), the driver including: a lighting driver configured to drive LED(s) of the lighting device in a first mode of operation when a primary power source is available and provided to the lighting driver and to control power output and/or LED current in a second mode of operation utilizing a secondary power source responsive to a detected or otherwise obtained condition or status associated with the lighting driver.

In an example embodiment, a driver for a lighting device includes: a LED driver configured to drive LED(s) that are operatively connected to the LED driver in a normal mode of operation and also during an emergency mode of operation.

In an example embodiment, a driver for a lighting device includes: a lighting driver configured to drive LED(s) of the lighting device in a normal mode of operation (e.g., when a primary power source is available and provided to the lighting driver) and to control power output and/or final output current of the lighting driver utilizing a backup or other secondary power source during an emergency mode of operation, the lighting driver being configured to drive the LED(s) during both modes of operation.

In example embodiments and implementations, the lighting driver includes a single instance of a lighting driver (e.g., only one LED driver circuit) configured to drive LED(s) of the lighting device during both modes of operation.

BRIEF DESCRIPTION OF THE DRAWINGS

FIG. 24 shows an isometric view from the front of an LED driver/backup unit with the battery cover removed;

FIG. 24A is a close-up view of the battery on/off switch, the self-test procedure select switch, and the emergency power select switch of the LED driver/backup unit;

FIG. 24B is a isometric view from the back of the LED driver/backup unit with the battery cover removed;

FIG. 25A is an isometric view of the LED driver/backup unit showing the back, top, and side;

FIG. 25B is an isometric view of the LED driver/backup unit showing the back, bottom, and side;

FIG. 25C is an isometric view of the LED driver/backup unit showing the front, top, and side;

FIG. 25D is an isometric view of the LED driver/backup unit showing the front, bottom, and side;

FIG. 27A illustrates a first step of a procedure for attaching a back side cover to the LED driver/backup unit;

FIG. 27B illustrates a second step of a procedure for attaching a back side cover to the LED driver/backup unit;

FIG. 27C illustrates a third step of a procedure for attaching a back side cover to the LED driver/backup unit;

FIG. 27D illustrates a fourth step of a procedure for attaching a back side cover to the LED driver/backup unit;

FIG. 27E illustrates a fifth step of a procedure for attaching a back side cover to the LED driver/backup unit;

FIG. 27F illustrates a sixth step of a procedure for attaching a back side cover to the LED driver/backup unit;

FIG. 27G illustrates a seventh step of a procedure for attaching a back side cover to the LED driver/backup unit;

FIG. 29A illustrates a fifteenth step of a procedure for attaching a back side cover to the LED driver/backup unit;

FIG. 29B illustrates a sixteenth step of a procedure for attaching a back side cover to the LED driver/backup unit;

FIG. 29C illustrates a seventeenth step of a procedure for attaching a back side cover to the LED driver/backup unit;

FIG. 29D illustrates a eighteenth step of a procedure for attaching a back side cover to the LED driver/backup unit;

FIG. 29E illustrates a nineteenth step of a procedure for attaching a back side cover to the LED driver/backup unit;

FIG. 29F illustrates a twentieth step of a procedure for attaching a back side cover to the LED driver/backup unit;

FIG. 29G illustrates a twenty-first step of a procedure for attaching a back side cover to the LED driver/backup unit;

FIG. 31A illustrates a fourth step of a procedure for attaching the LED driver/backup unit and BLS cover to a junction box;

FIG. 31B illustrates a fifth step of a procedure for attaching the LED driver/backup unit and BLS cover to a junction box;

FIG. 31C illustrates a sixth step of a procedure for attaching the LED driver/backup unit and BLS cover to a junction box;

FIG. 32A illustrates a seventh step of a procedure for attaching the LED driver/backup unit and BLS cover to a junction box;

FIG. 32B illustrates a eighth step of a procedure for attaching the LED driver/backup unit and BLS cover to a junction box;

FIG. 32C illustrates a ninth step of a procedure for attaching the LED driver/backup unit and BLS cover to a junction box;

DISCLOSURE OF INVENTION

Figure 1:
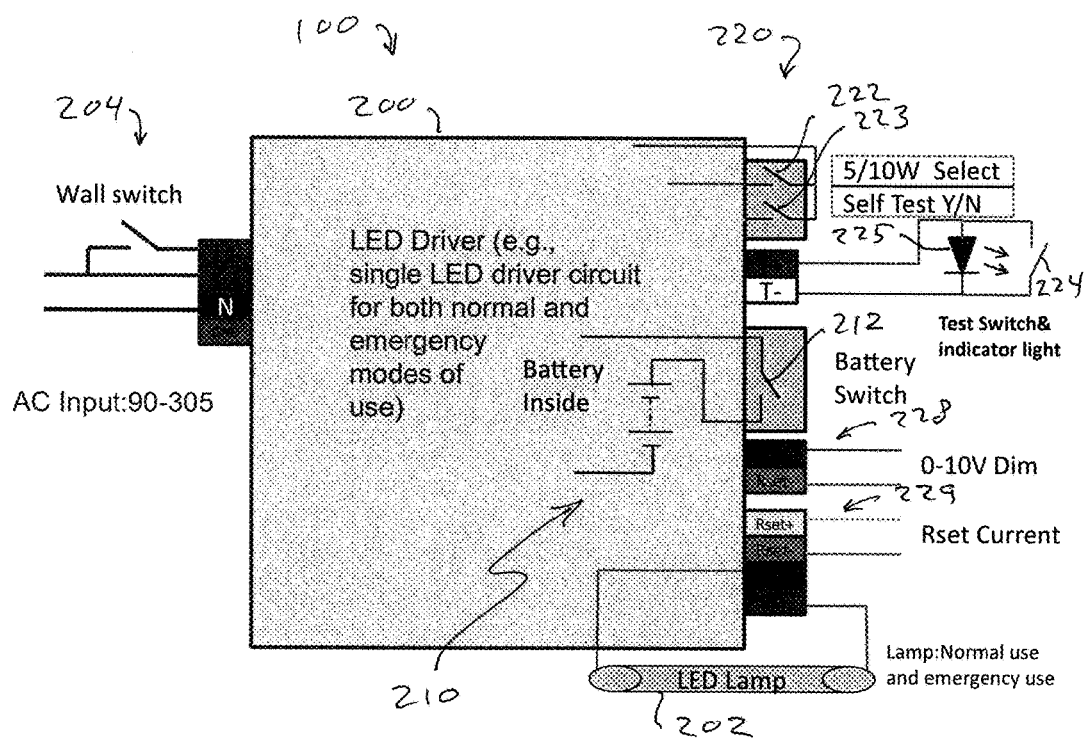
FIG. 1 is a diagram of an example lighting system that includes a LED driver shown connected to a LED lamp and to power and interface and indicator elements.
Figure 1A:
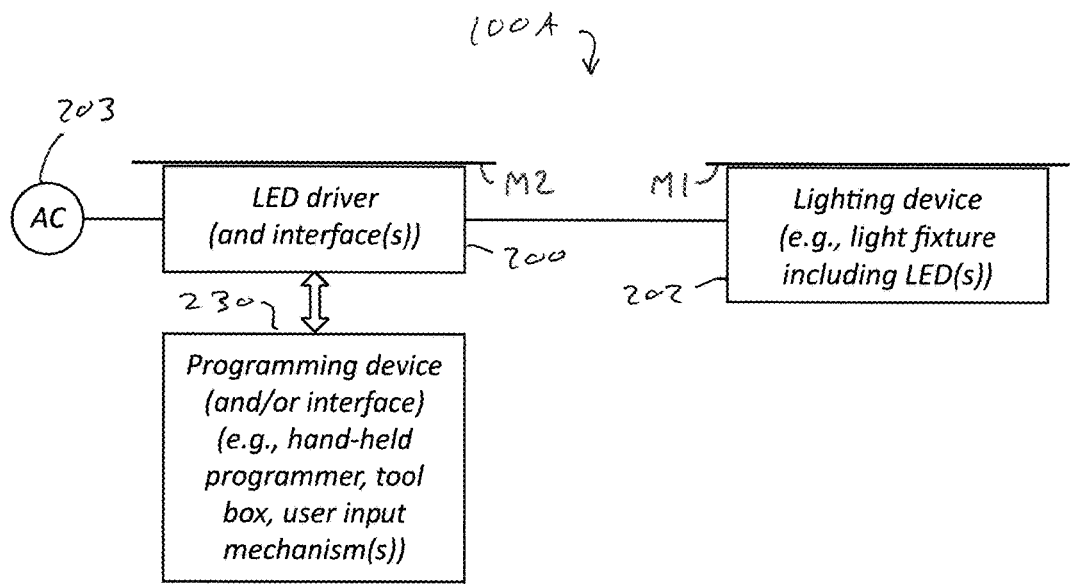
FIG. 1A shows an example of an LED driver and lighting device (e.g., light fixture including LED(s)) in a non-collocated configuration.
Figure 1B:
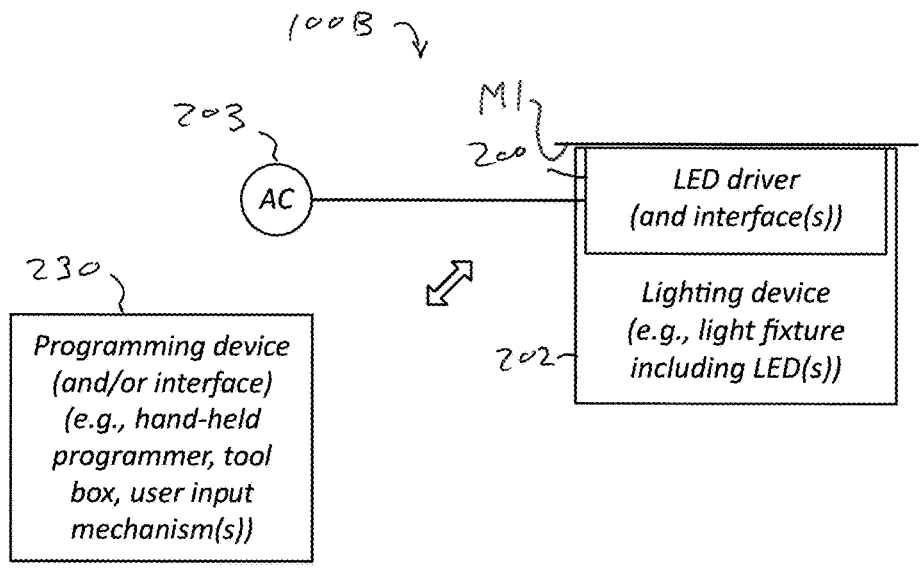
FIG. 1B shows an example of an LED driver and lighting device (e.g., light fixture including LED(s)) in a collocated configuration.

Referring to FIGS. 1, 1A and 1B, an example lighting system 100 includes a LED driver 200 and a lighting device 202 (a light fixture including LED(s), for example, a LED lamp). In this example implementation, the LED driver 200 and lighting device 202 are configured (operatively connected/interfaced) to a primary power source 203 (e.g., AC input: 90-305V), which can be made available via switch 204 (e.g., a wall switch). A secondary power source 210 (e.g., one or more batteries) can be located within and/or secured to an enclosure or other portion of the LED driver 200 (or the lighting system 100) and can be made available as described herein utilizing a battery switch 212. By way of example, the secondary power source 210 can be a lithium iron phosphate battery. The LED driver 200 includes or is provided with interface(s) 220 (I/O, comm, or other) which, in this example embodiment, include input switches 222 (5/10 W Select) and 223 (Self Text Y/N), test switch 224 and indicator light 225, and ports 228 and 229 (e.g., 0-10V dimming and current set inputs, respectively). In example embodiments and implementations, the lighting system 100 additionally includes a programming device (and/or interface) 230 (e.g., hand-held programmer, tool box, user input mechanism(s)).

As discussed below in greater detail, FIGS. 1A and 1B show examples of an LED driver and lighting device (e.g., light fixture including LED(s)) in non-collocated and collocated system configurations denoted 100A and 100B, respectively.

With reference to FIGS. 2A and 3-20, the lighting system 100 can include, for example, the following devices or components: line 101, EMI filter and rectifier 102, input over and under voltage protection circuit 103, AC input detection circuit 104, isolation 105, DC/DC control 106, isolated DC to DC converter circuit 107, isolation 108, DC/DC converter 109, output voltage feed-back and LED forward voltage follower and detection circuit and dimming 110, LED current and voltage feed-back circuit 111, Vo control and LED detector (and regulator) 112, DC/DC converter 113, emergency control circuit 114, DC/DC converter constant power and battery discharge 115, emergency constant power level selection switch and circuit 116, (and additionally or alternatively in respect to circuit 116) (comm) interface (circuit) 117 (e.g., 0-10V Dali, wireless ZigBee), LED current from Rset or program box and dimming level and curve from program box circuit 118, a circuit 119 (providing: Self-checking switch and circuit; Emergency power selection 5 W/10 W switch and circuit; and Temperature detection Circuit to protect against over temperature—see FIG. 19), test switch circuit and information indicator light 120, over temp protection circuit 121, processor(s) and/or controller(s) 122 (e.g., including a current mode PWM controller such as RT8480 configured as shown—see EM Circuit 500, FIG. 5), regulator 123, (DC/DC converter and) battery discharge circuit 124, self-checking switch and circuit 125, switch 126 (for adjusting constant power output in EM mode) and battery 128 configured as shown (and/or as further described herein, or sub-combinations thereof—in this regard, see FIG. 2B which shows another lighting system 100' in which elements thereof correspond to like-numbered components of the lighting system 100, except for the omission of EMI filter and rectifier 102 and switch 125. The systems of FIGS. 2A and 2B, respectively, and lighting drivers described herein can be implemented in various ways including and/or utilizing processor(s) and/or controller(s), software, and firmware. The processor(s) and/or controller(s) 122, are in some instances referred to generally as the microprocessor control unit "MCU" and, as used herein, additionally include the controller 127 (e.g., a control circuit including a microcontroller such a STM8S20xxx 8-bit MCU configured as shown—see MCU control Circuit and MCU Controller pinout, FIGS. 6 and 6A, respectively). Communication(s)/interface(s) between the EM circuit 500 (FIG. 5), which includes the controller circuit 122, and the MCU control Circuit 127 (FIG. 6) is/are configured for example as shown in FIGS. 5, 6 and 6A and in the software flowcharts of FIGS. 21, 22A, 22B, 23A, 23B, 23C, 23D and 23E (as applicable) and/or as otherwise or additionally provided herein.

Figure 3:
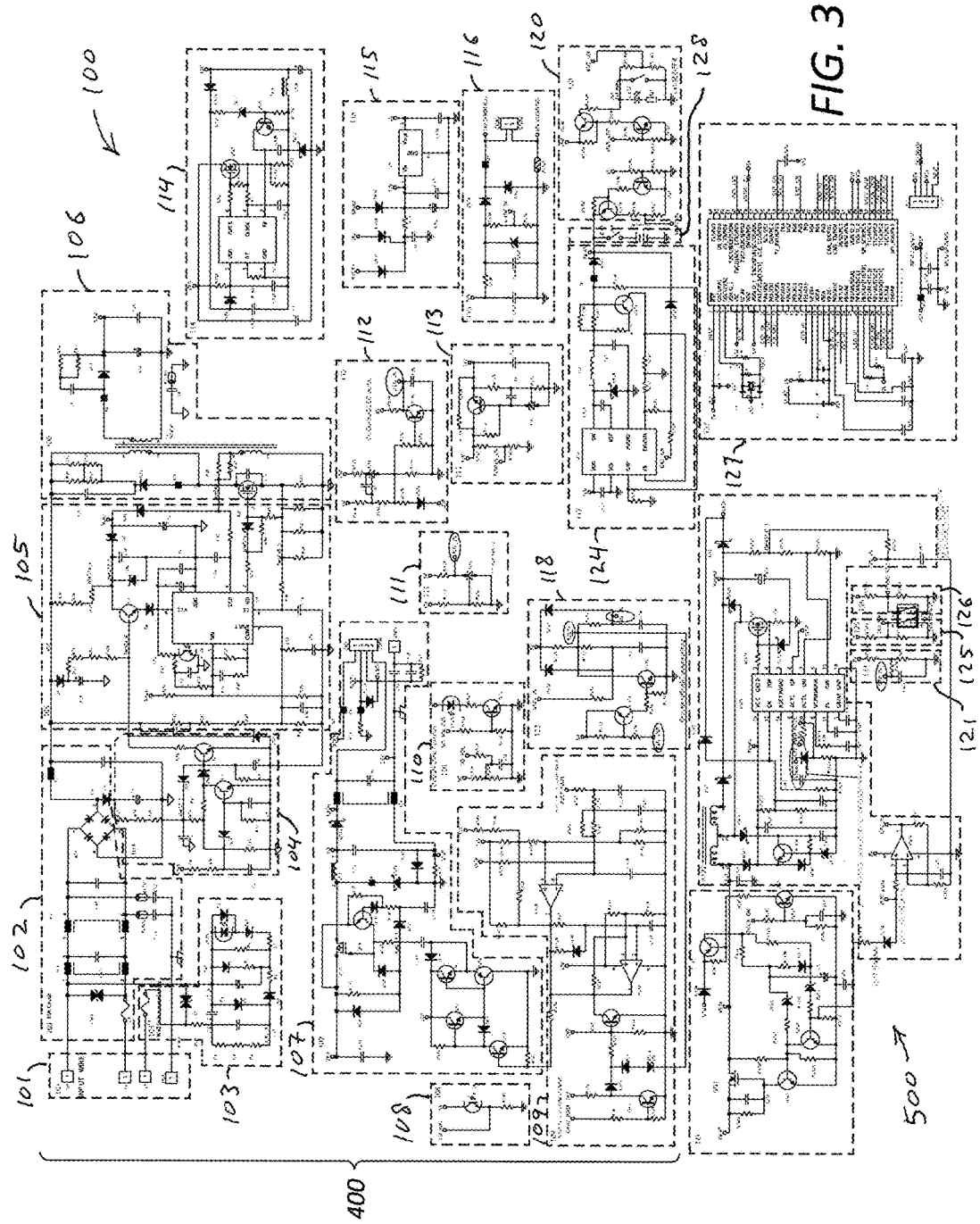
FIG. 3 is a detailed circuit diagram of the lighting system.
Figure 4:
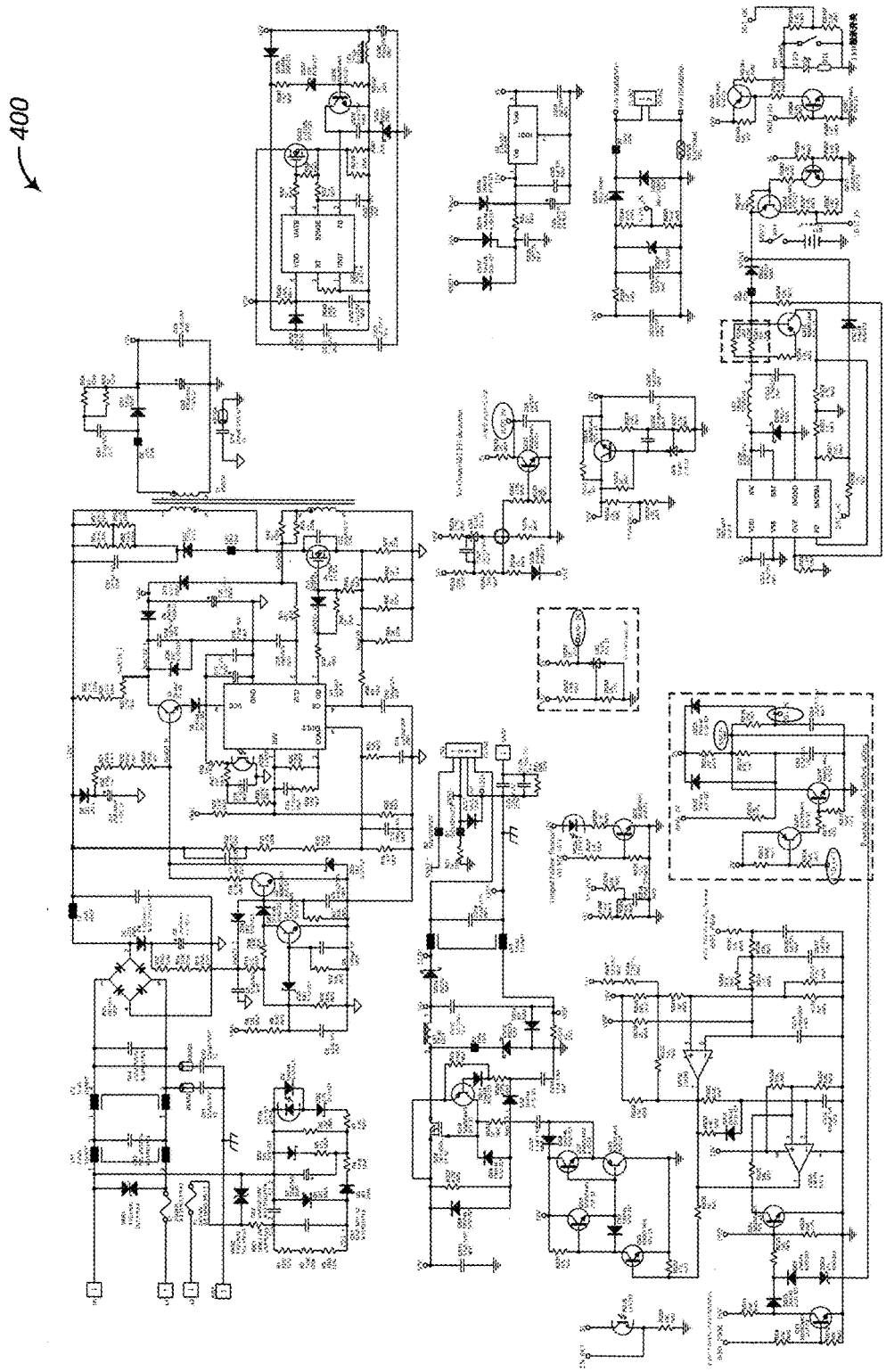
FIG. 4 shows (in larger size) a portion of the circuitry in FIG. 3.
Figure 5:
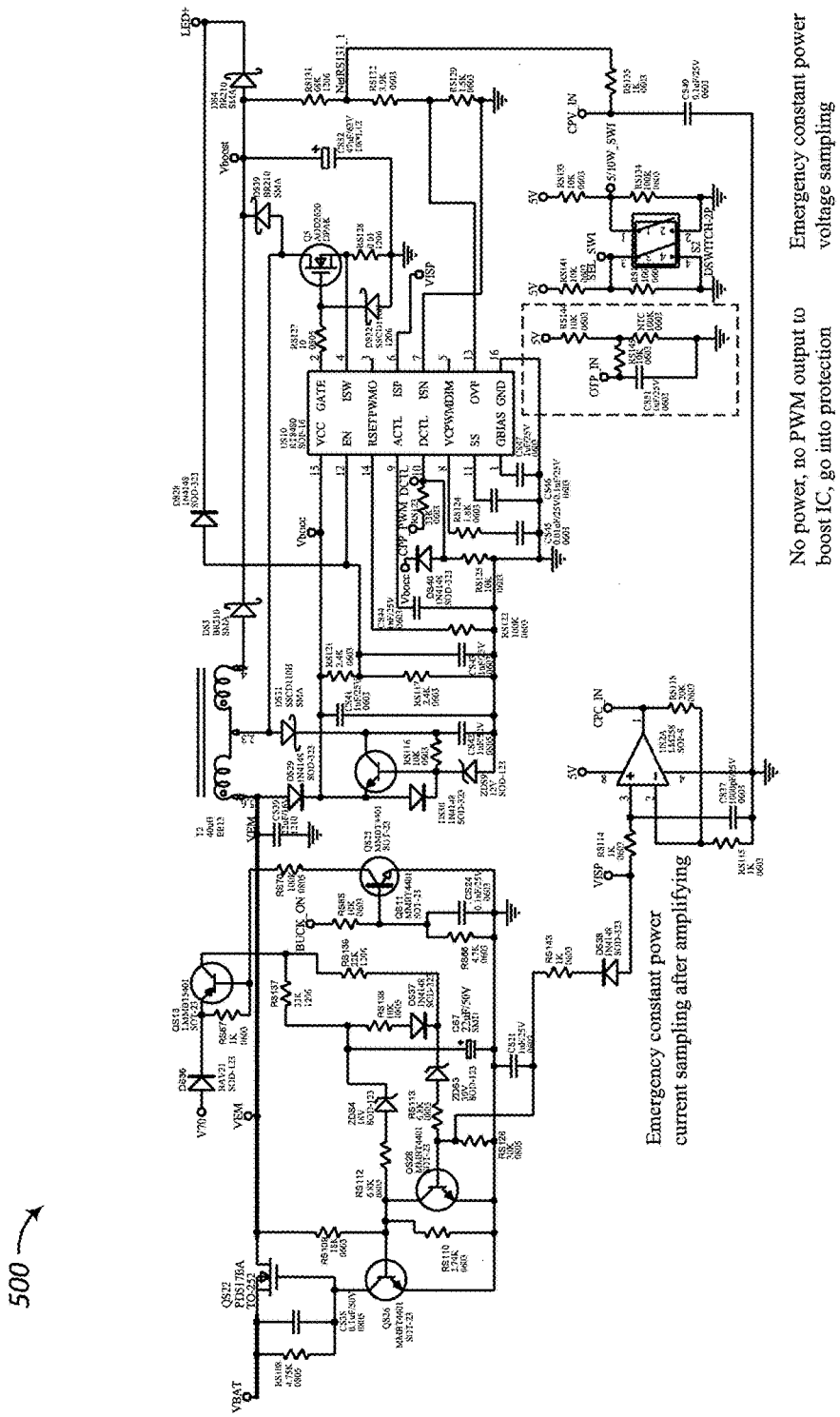
FIG. 5 is a diagram of an emergency mode (EM) circuit of the lighting system.
Figure 13:
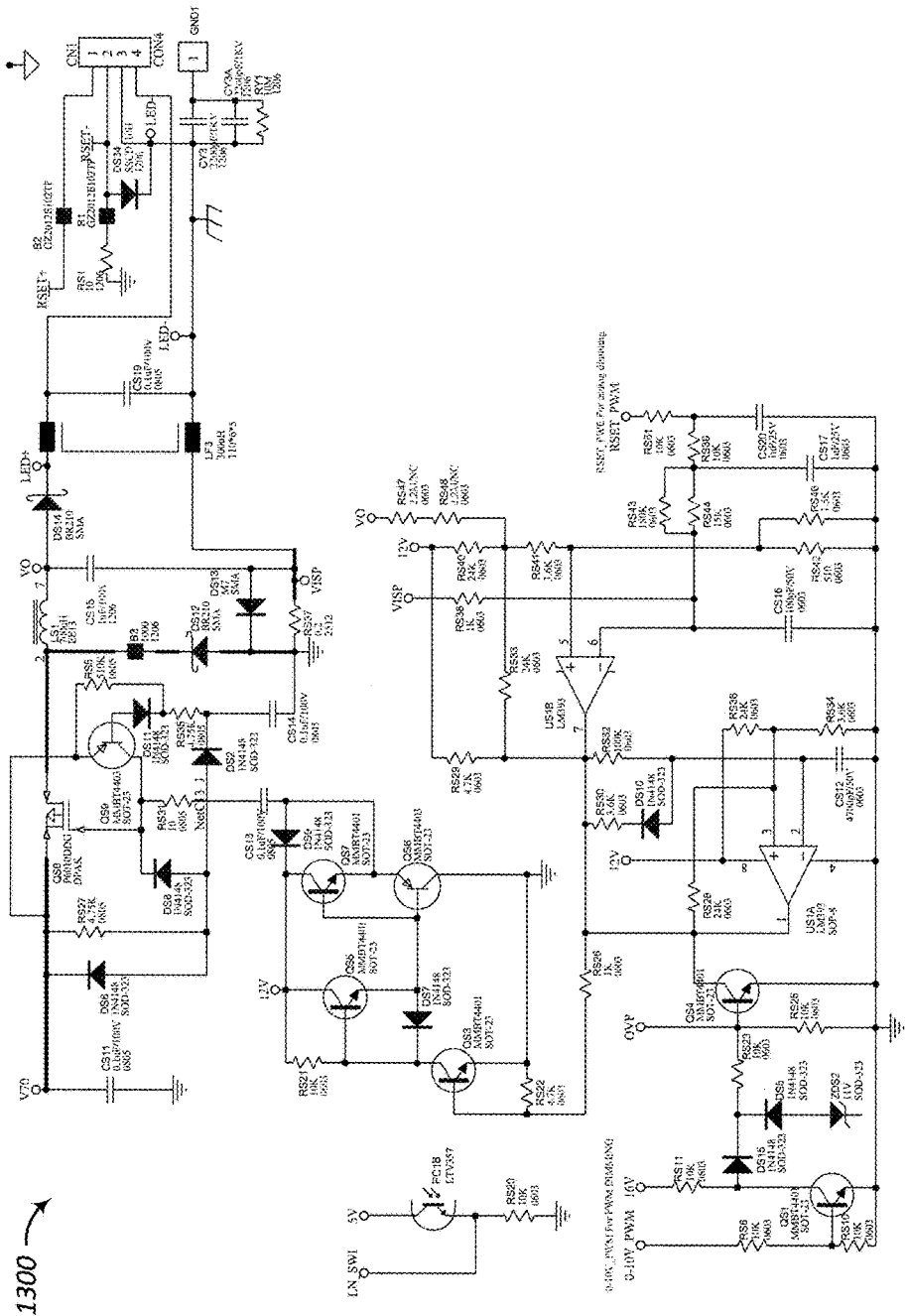
FIG. 13 shows lighting system circuitry that includes an auxiliary hysteresis BUCK circuit.
Figure 15:
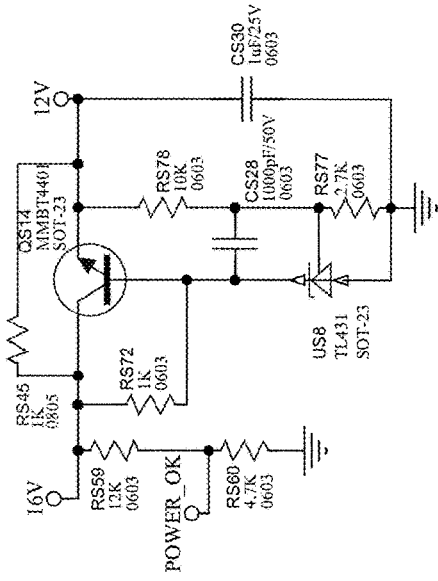
FIG. 15 shows a DC/DC converter.
Figure 14:
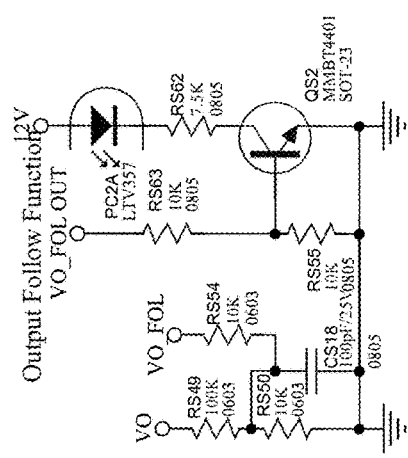
FIG. 14 shows lighting system circuitry that includes circuitry for providing output voltage feedback and LED forward voltage following and detection, and dimming.

Referring to FIGS. 3, 4 and 13, the lighting system 100 includes (components, referred to for convenience as) electronics 400, which in turn include an auxiliary hysteresis BUCK circuit 1300. Communication(s)/interface(s) between the auxiliary hysteresis BUCK circuit 1300 (FIG. 13), which includes isolated DC to DC converter circuit 107, isolation 108 and DC/DC converter 109, and the controller 127 (FIG. 6), is/are configured for example as shown in FIGS. 6, 6A and 13 and in the software flowcharts of FIGS. 21, 22A, 22B, 23A, 23B, 23C, 23D and 23E (as applicable) and/or as otherwise or additionally provided herein.

Figure 6:
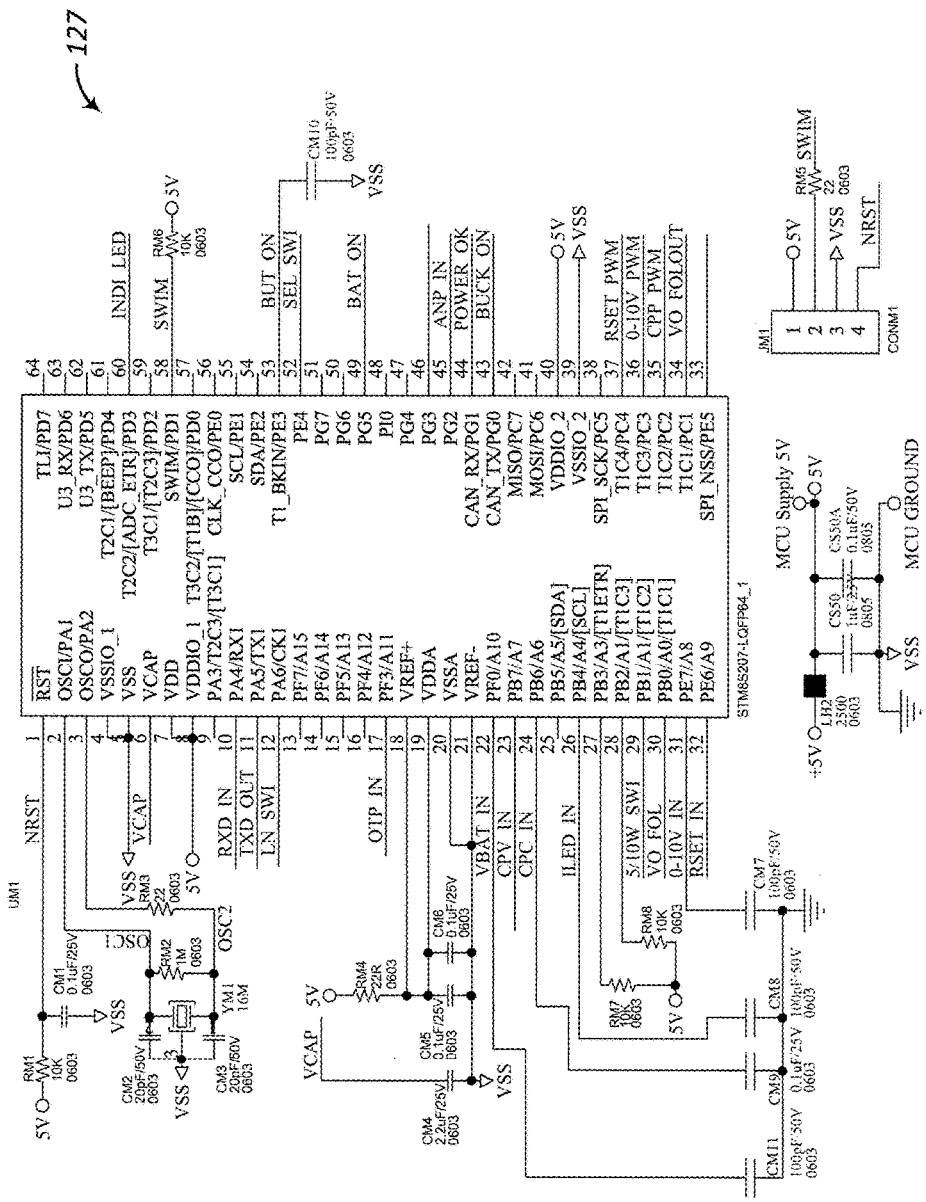
FIG. 6 is a diagram of an MCU control circuit of the lighting system.
Figure 6A:
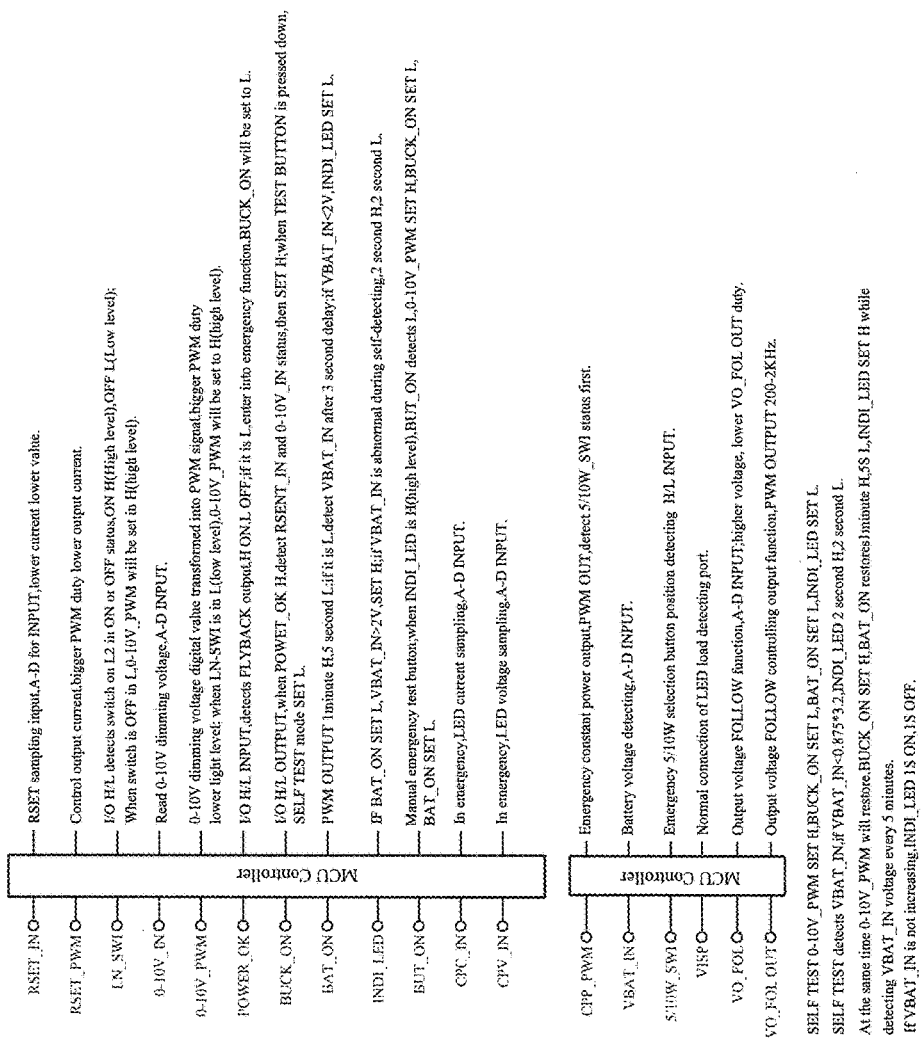
FIG. 6A is a diagram of an MCU controller pinout.
Figure 16:
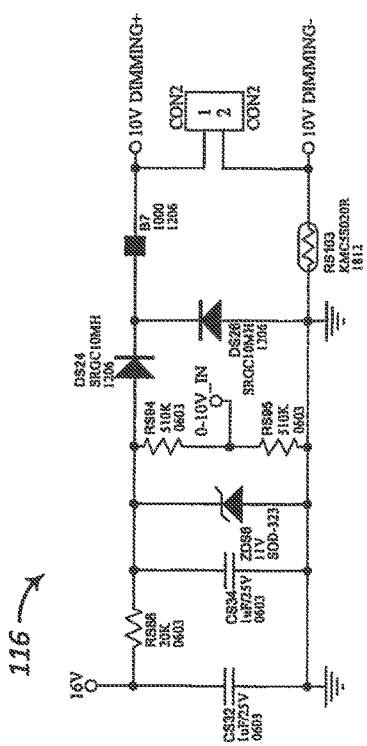
FIG. 16 shows emergency constant power level selection switch and dimming circuit.
Figure 16A:
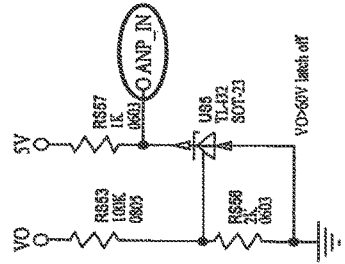
FIG. 16A shows an LED current and voltage feedback circuit.
Figure 16B:
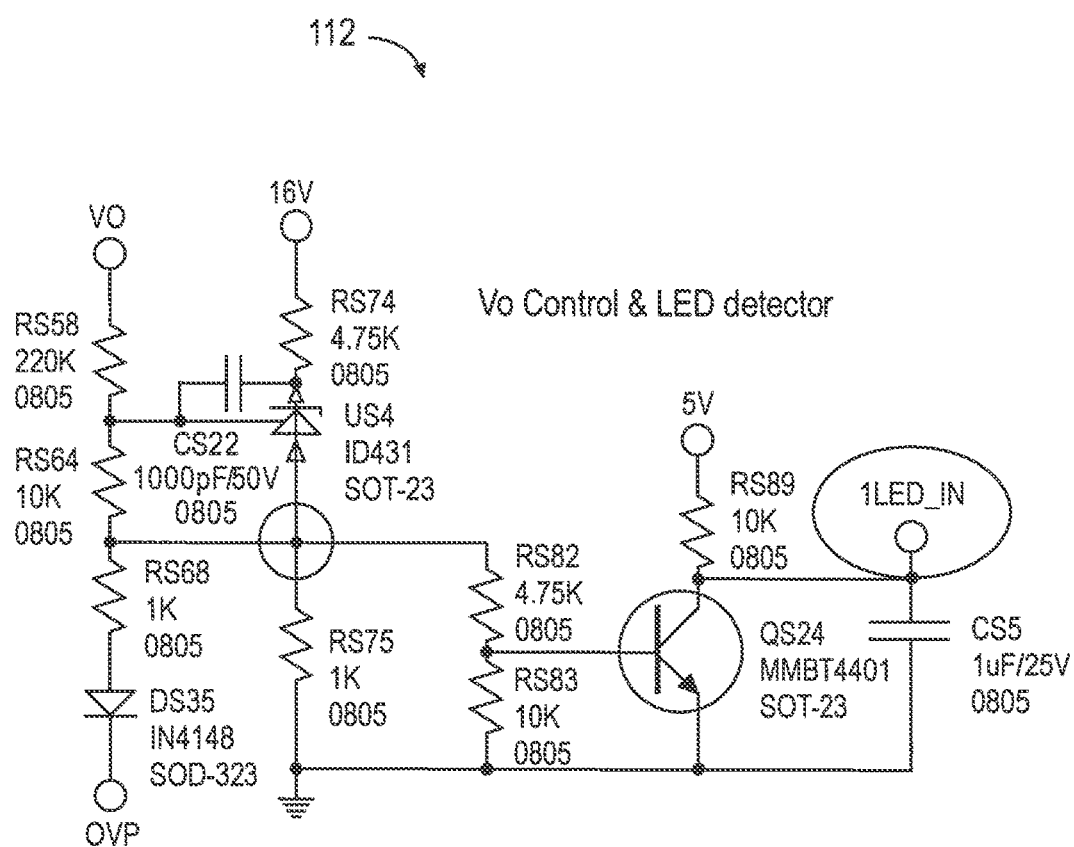
FIG. 16B shows the Vo control and LED detector circuit.
Figure 16C:
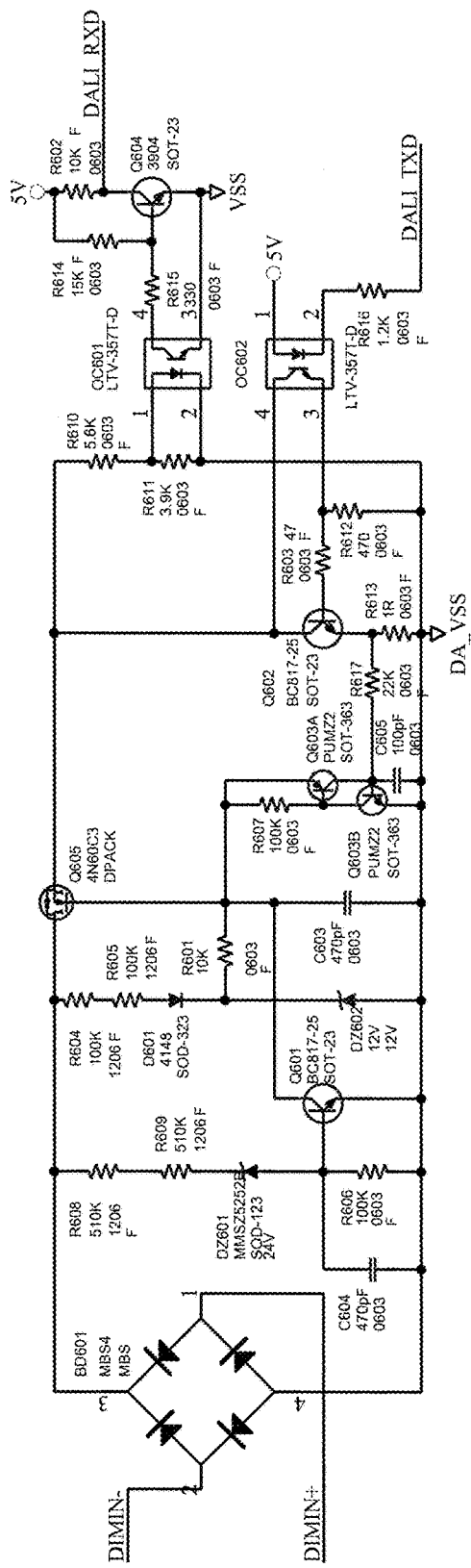
FIG. 16C shows an interface circuit.

Referring to FIG. 16C, in systems including or utilizing the interface (circuit) 117 (e.g., 0-10V Dali, wireless ZigBee), communication(s)/interface(s) between the interface (circuit) 117 and the controller 127 (FIG. 6) is/are configured for example as shown in FIGS. 6, 6A and 16C and in the software flowcharts of FIGS. 21, 22A, 22B, 23A, 23B, 23C, 23D and 23E (as applicable) and/or as otherwise or additionally provided herein.

In respect to this description, and in the interest of brevity, functionalities and/or operational or other characteristics of circuit and other components herein, e.g., provided in the figures viz-à-viz identifications of particular components and/or particular arrangements thereof which would have been understood in relation to this description by one of skill in the art are and are considered to be incorporated herein.

Example embodiments described herein relate to technologies and methodologies for providing a driver for a lighting device (e.g., including at least one light emitting diode (LED)), the driver being configured to drive LED(s) of the lighting device (e.g., a light fixture/luminaire configured to facilitate electrical/operative connection between the LED driver and a LED lamp) in a first (normal/standard/default/primary) mode of operation (e.g., when a primary power source is available and provided to the lighting driver) and (to control power output and/or LED current) in a second (emergency/backup/supplemental/alternative/secondary) mode of operation (utilizing a secondary power source, e.g., a backup battery) responsive to a detected or otherwise obtained condition or status associated with the lighting driver (e.g., when the primary power source is not available). In example embodiments and implementations, the lighting driver includes a single instance of a LED driver (e.g., only one LED driver circuit) configured to drive LED(s) of the lighting device as described in the preceding sentence and/or facilitating one or more other features/functionalities described herein.

In example embodiments and implementations, the lighting driver provides power to a LED light source for both an emergency mode and a normal driver mode (e.g., an "all-in-one" emergency LED driver in a single stage package).

Features/potential advantages of the LED Emergency Driver described herein include inter alia: Wide input voltage range 90-305V, Under Voltage Protection, Over Voltage Protection, Loss of Power enters emergency mode, High battery converter efficiency (>80%), longer emergency runtime, Long LED life, Save energy compared with Fluorescent, Normal use change to emergency, no relay used, Improved reliability Output Voltage limit to 60V, Class 2, safely, 0-10V dimming, range 1-100%, Output Voltage range 10-60V, Current 100-1400 mA self-setting, Self-diagnostic with status feedback.

Figure 2A:
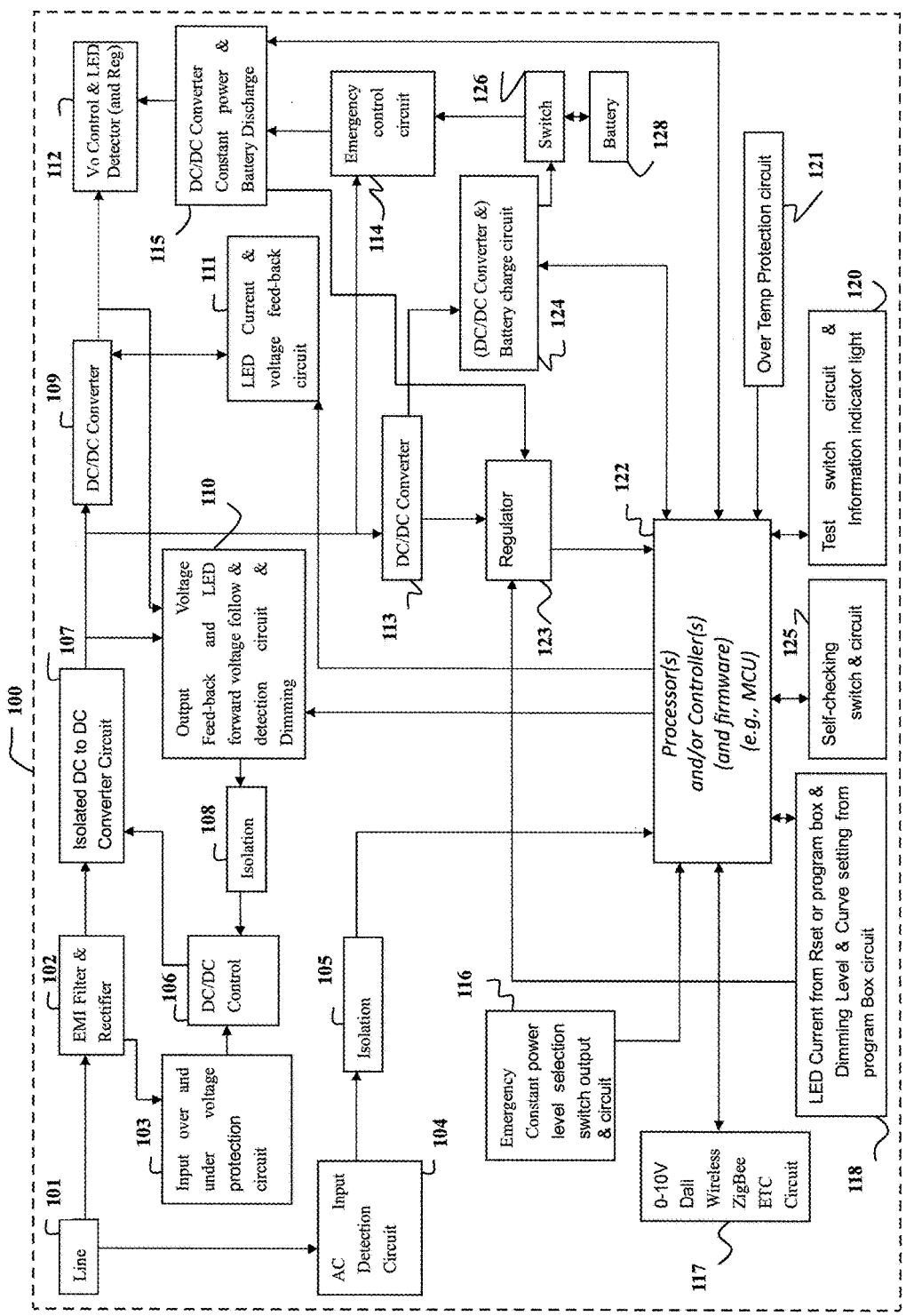
FIG. 2A is a high-level diagram of a lighting system in an example embodiment.
Figure 2B:
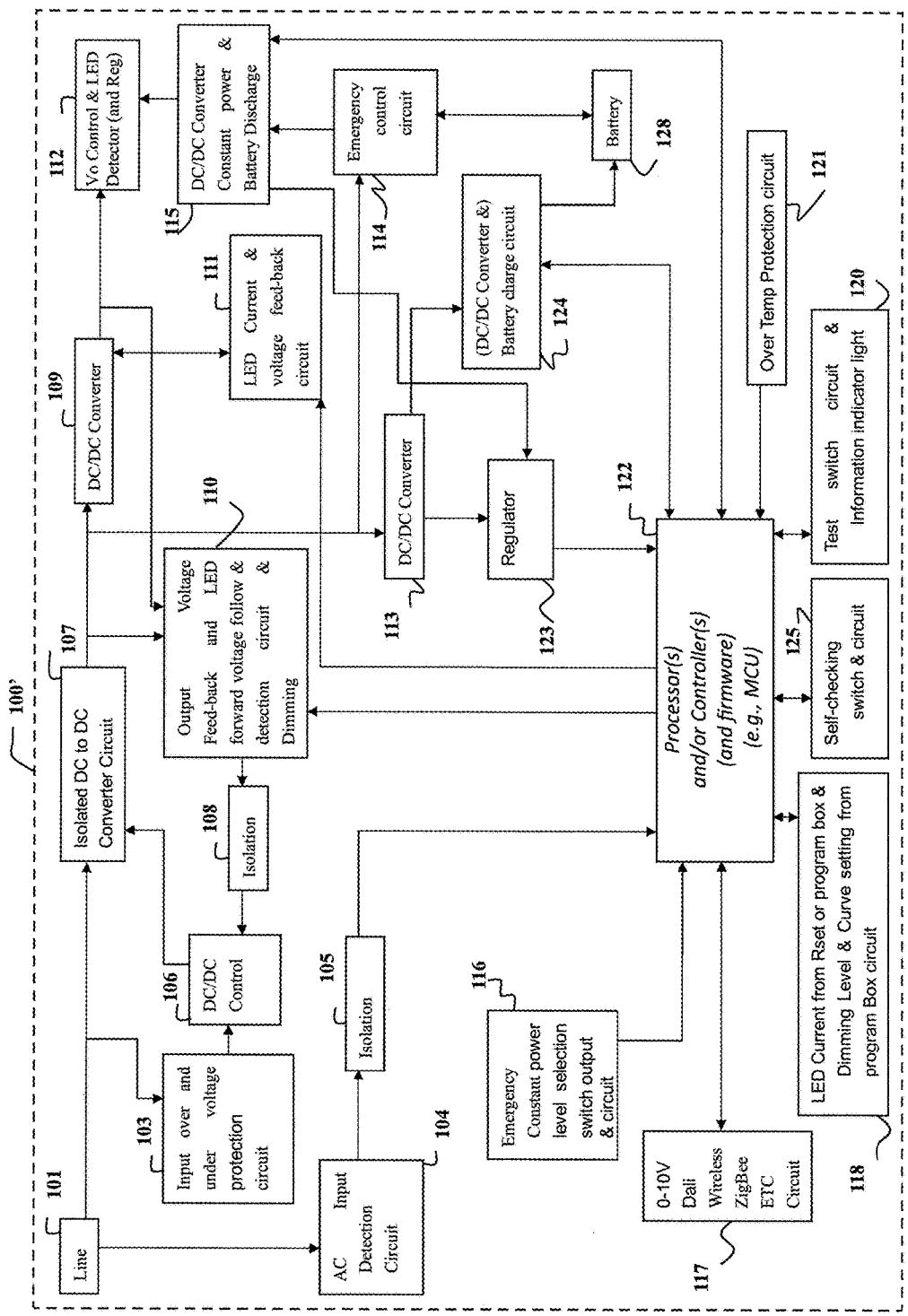
FIG. 2B is a high-level diagram of a lighting system in another example embodiment.

With reference to FIG. 2A, in this example embodiment, the lighting system 100 has one shared front end and separate inputs 102 and 104. The AC input detection circuit 104 senses whether power is on. Thusly, in comparison to conventional multi-stage drivers, energy savings result with one flyback circuit 124 providing control. FIG. 4 shows circuitry 400 (identified in FIG. 3) in relation to Flyback & DC-DC convert.

The EM Circuit 500 (FIG. 5) is configured to respond to power anomalies/failures and includes, for example, a current mode PWM controller (e.g., RT8480) configured as shown. As noted in FIG. 5, there is constant power current sampling after amplifying. In respect to circuit operation, when there is no power, there is no PWM to boost IC: go into protection. In emergency mode, there is constant power voltage sampling. Further as to FIG. 5, in this example embodiment, the VISP (Normal connection of LED load detecting port) function is used as load detection for the buck controller. For the MCU controller, ILED_IN on the MCU is used to detect LED Load.

In respect to the MCU control Circuit 127 (FIG. 6), the same physical layer and same software can be utilized for effecting/controlling functionalities inclusive of, for example, dimming and reporting status via the bi-directional comm interface. Programmed features can include, for example, output current for normal mode—e.g., 4 hours, 4 Watts. Battery capacity (typical): at least 90 minutes at 10 Watts; 180 minutes at 5 Watts. In example embodiments and implementations, the processor(s) and/or controller(s) (e.g., MCU) also provide/control battery backup (monitored and controlled by microprocessor), and control both AC and DC function and the boost circuit.

Figure 7:
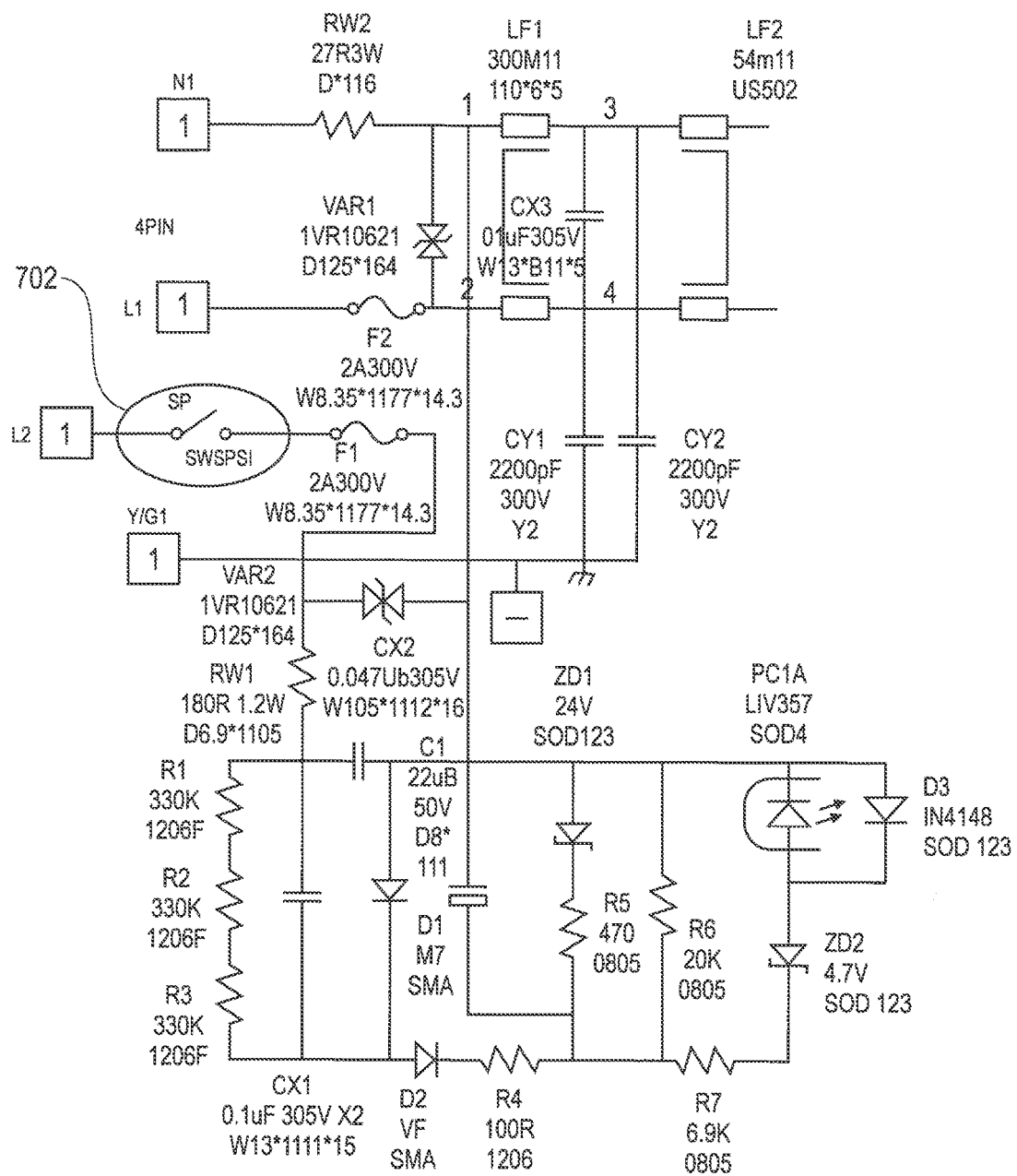
FIG. 7 shows lighting system circuitry that includes a wall switch.

Referring to FIG. 7, the circle 702 in represents a wall switch. When there is electricity supplied, the LED will be illuminated (as wall switch is ON), lightings will be turned off as switch is turned OFF, battery will stay charging regardless if switch is ON or OFF. When there is no electricity supplied, driver will go into emergency mode, battery starts discharging and LEDs are illuminated, regardless if switch is ON or OFF.

Figure 8:
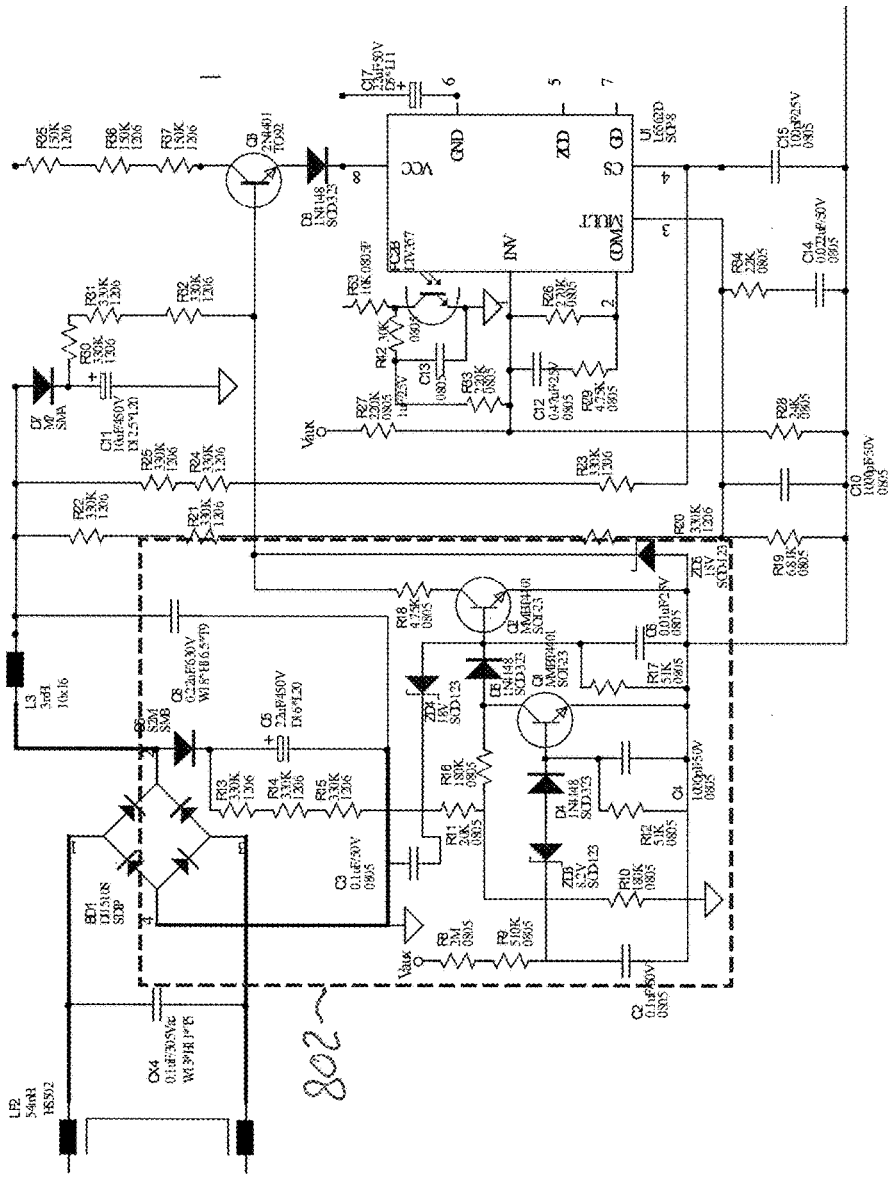
FIG. 8 shows lighting system circuitry that includes input over voltage and under voltage protection.

Referring to FIG. 8, the rectangle 802 in left drawing identifies input over voltage and under voltage protection. If over voltage or under voltage condition occurs, IC U1 will shut down and FLYBACK circuit stops operating, battery starts discharging and LEDs are illuminated. When input voltage is restored to normal condition the driver will stop emergency function automatically and battery charging is restored. In normal operation, LED will be turned ON or OFF by wall switch only.

Figure 9:
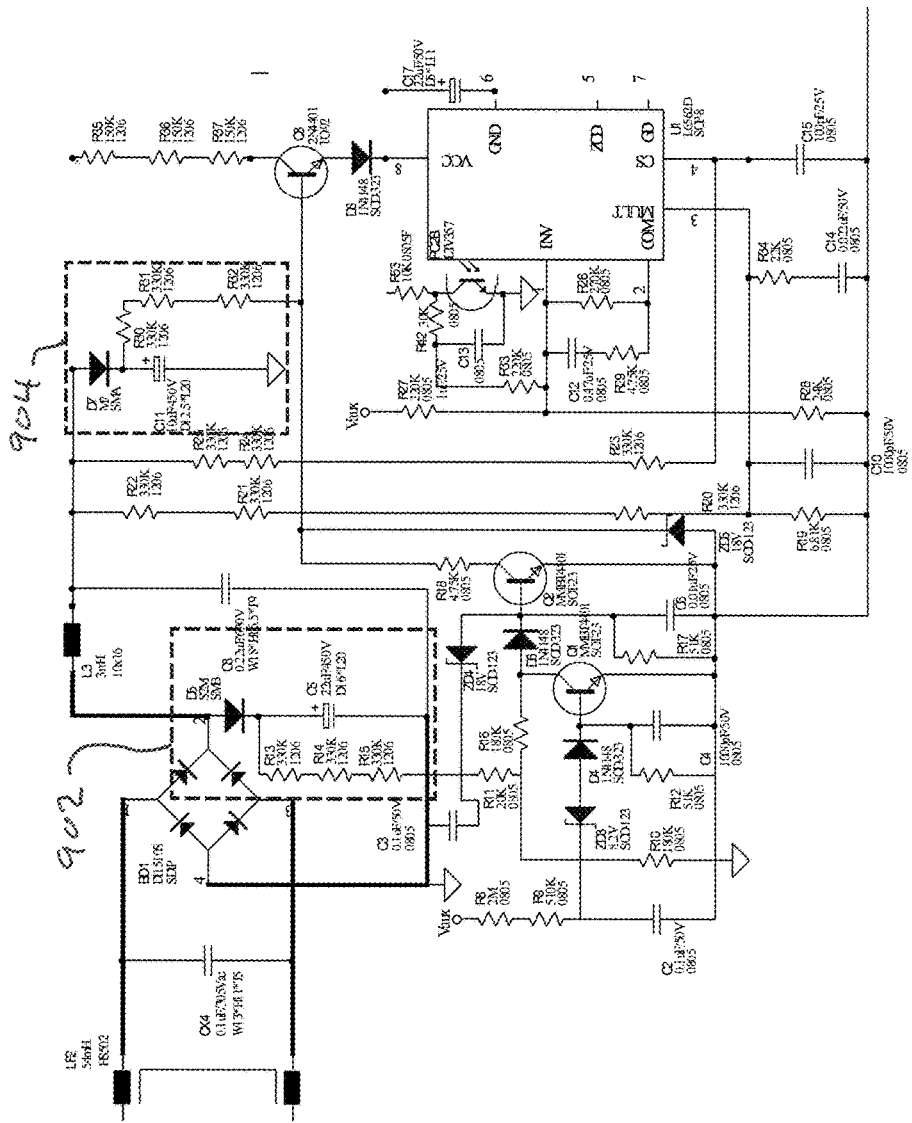
FIG. 9 shows lighting system circuitry that includes an input surge protection circuit.

Referring to FIG. 9, rectangles 902 and 904 are the input surge protection circuit. High voltage spike energy at input will be stored in the capacitor; this will reduce component stress and allow the device to withstand higher surge voltage. Additionally, C5 has input voltage sampling function and detects input voltage accurately for providing accurate signal for under voltage and over voltage protection.

Figure 10:
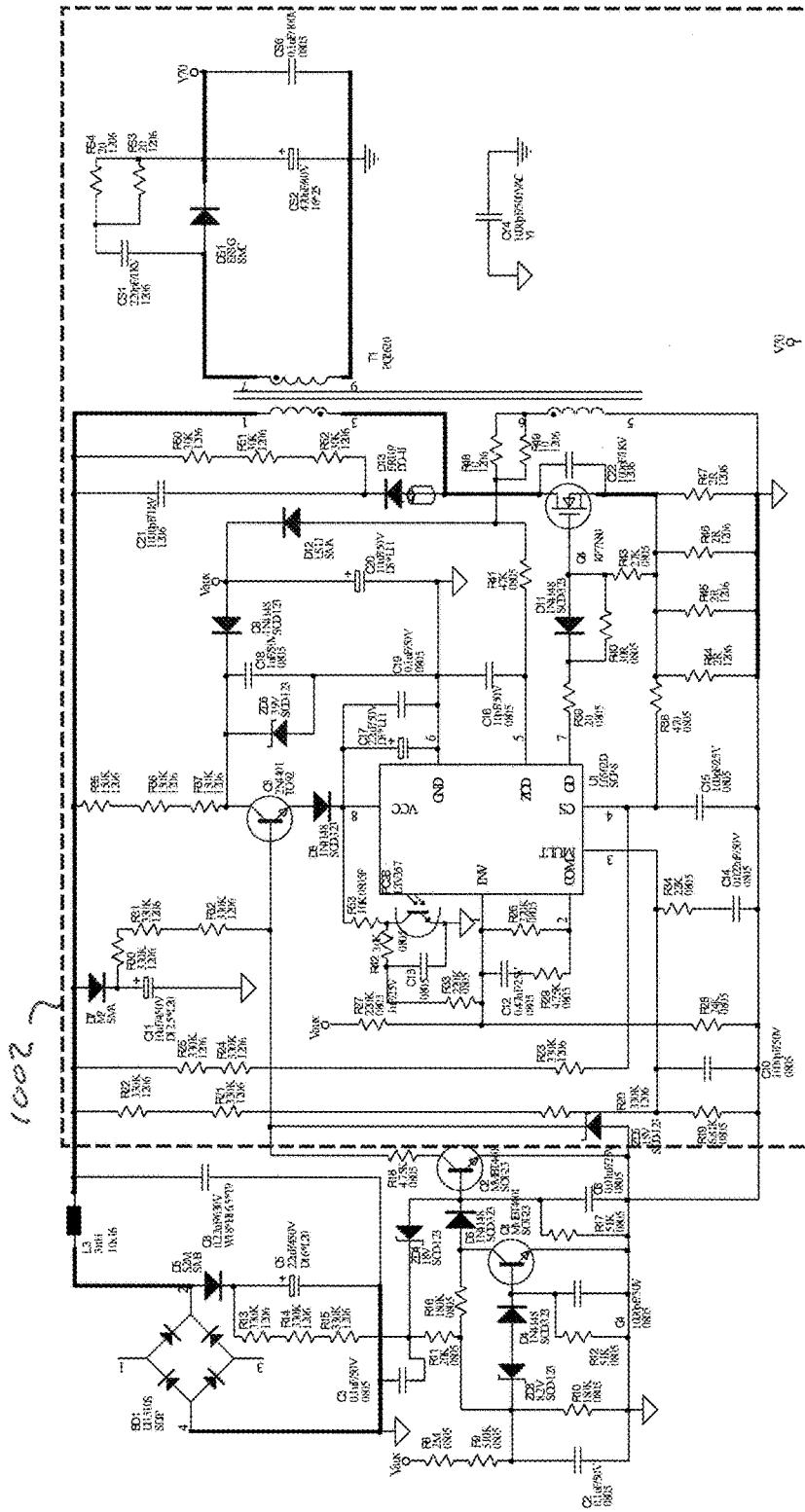
FIG. 10 shows lighting system circuitry that includes a singe stage PFC flyback circuit.

Referring to FIG. 10, the rectangle 1002 identifies a single stage PFC flyback circuit. With AC input 90-305 Vac, the circuit (as configured, for example) provides a stable DC voltage output, and DC voltage will be changed according to load voltage. Changing the flyback output DC voltage in this manner increases system efficiency.

Figure 11:
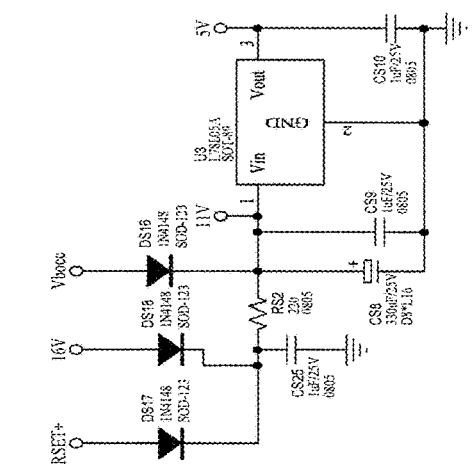
FIG. 11 shows lighting system circuitry that includes DC/DC converter constant power and battery discharge circuitry.

Referring to FIG. 11, the circuit 115 receives Inputs: RSET+ and Vbocc and as configured provides an accurate 5V power supply circuit for microcontroller and auxiliary circuit. In normal or emergency conditions, this voltage stays constant allowing the microcontroller to function in both normal and emergency conditions. In the present context, RSET+ refers to RSET In or Resistor Set In, and not "reset".

Figure 12:
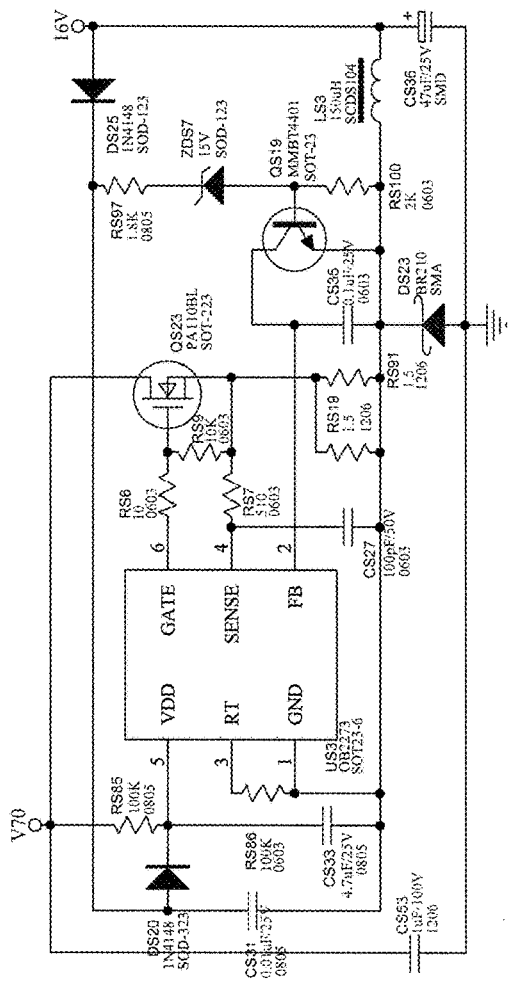
FIG. 12 shows lighting system circuitry that includes an emergency control circuit.

Referring to FIG. 12, in this example implementation, the circuit 114 includes a controller (e.g., Current Mode PWM Controller OB2273) which configured as shown provides a low voltage power supply circuit for auxiliary control and battery charging circuit including active 0-10V dimming circuit and BUCK control circuit (emergency control circuit).

Referring to FIG. 13, in this example implementation, the Auxiliary hysteresis BUCK circuit 1300 is configured to utilize Rset Current, setting final output current for driver (to match with the LED array, e.g., at factory). The provides, facilitates and/or utilizes the following:
Output current PWM Dimming
Latch output voltage <60V
Output current setting and linear dimming
Rset port: set different resistor value [using Tool box/kit] for different output current setting externally Referring to FIG. 14, the detecting output voltage and providing reference voltage for voltage following up and power limiting function circuit 110 can be implemented as shown. VO_FOL is for detecting output voltage and providing reference voltage for voltage following up and power limiting function. Duty of VO_FOL OUT will be changed according to VO_FOL value and carrying out voltage following up function. The circuit provides over voltage latching up function and reduce output voltage in abnormal condition ensuring that output voltage is lower than 60V.

In example embodiments and implementations, the LED driver is configured to implement a pulse width modulation (PWM) (or other) technique or protocol of dimming output current of the LED driver.

Referring to FIG. 16, the emergency constant power level selection switch output and circuit (dimming circuit) 116 receives Inputs: 10V DIMMING+ and 10V DIMMING– (which can be provided via a resistor or other resistive element connected at CON2, pins 1 and 2) and allows the LED normal operation current to be set via connector with feedback to the driver on the set current. The 1-10V dimming circuit configured as such provides 0-10V_IN thereby facilitating LED brightness adjustment. The LED brightness is not adjustable in the emergency condition. FIG. 16A shows the LED current and voltage feed-back circuit 111 which, as configured, provides VO>60V latch off (Output Voltage latch off when the Voltage is higher than 60V) and ANP_IN. FIG. 16B shows the Vo control and LED detector (and regulator) 112, which detects whether the LED load is ON or OFF. The circuit 112, which can include a shunt regulator (TL431, for example), sets the max Voltage at 56V (for example) at normal work status, and provides the ILED_IN signal. The circuit 112 provides ILED_IN as feedback for regulation during normal operation. During emergency operation CPV_IN (FIG. 5) is used.

Alternatively, the 0-10V dimming circuit 116 (FIG. 16) is replaced with a Dali, ZigiBee, Wifi, or other (wired or wireless) interface—which also facilitates LED 1-100% dimming via 0-10V interface for normal operation. For example, and referring to FIG. 16C, an alternative interface circuit 117 can be provided in the form of a Dali daughterboard (e.g., as shown). DALI_RXD and DALI_TXD would interface with the microprocessor and DIMIN– and DIMIN+ would interface with the DALI loop.

Figure 17:
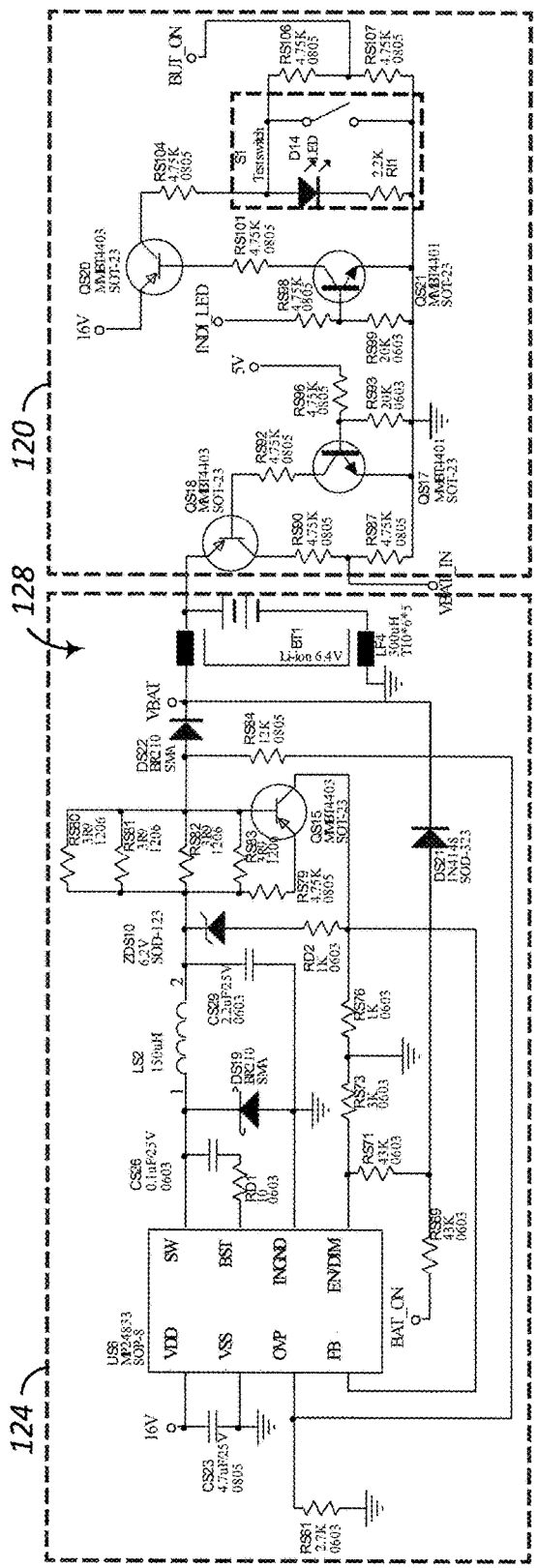
FIG. 17 shows a battery discharge circuit, a test switch circuit, and an information indicator light.

Referring to FIG. 17, in this example implementation, the circuit 124 (implemented with MP24833 as shown) as configured provides a battery charging circuit with features as follows: constant voltage and constant current charging, pulse charging method, reduce charging time interval ratio when battery voltage is high and achieve battery detection. Referring also to FIG. 17, the circuit 120 (test switch circuit and information indicator light) in this example, as configured, provides a product status indicator. The circuit provides VB_AT_IN, is coupled to INDI_LED, and includes SW1 Test switch, and LED indicator light. A user of the lighting driver can distinguish driver status for charging, emergency and battery abnormal by observing the indicator; each condition will have difference display method identifying the condition.

Figure 18:
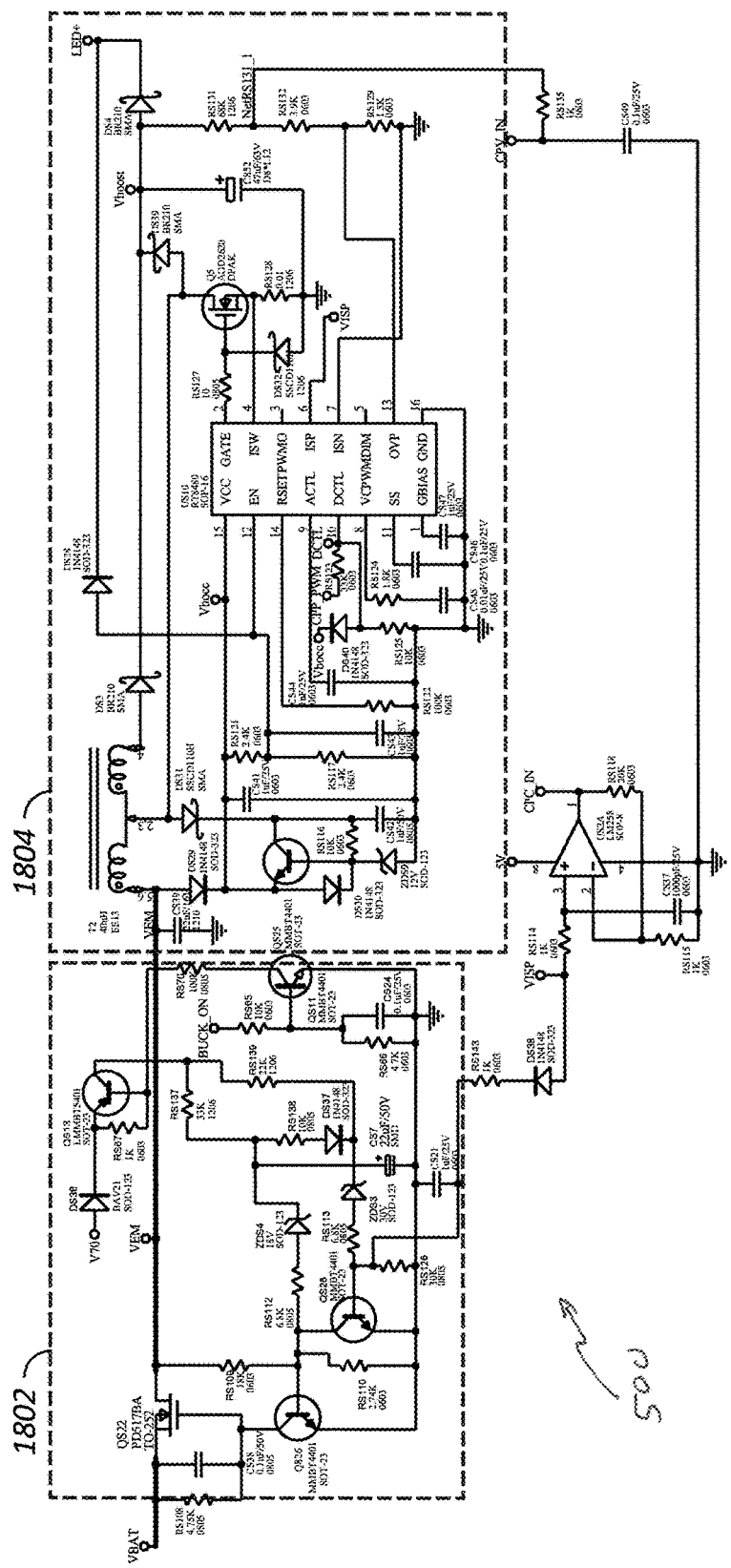
FIG. 18 shows a battery excessive discharge protection circuit and a circuit for boosting battery voltage in emergency mode.

Referring to FIG. 18 (which shows portions of the EM Circuit 500), a battery excessive discharge protection circuit 1802 as configured prevents battery damage in emergency mode, and disables EM operation until first powered on condition. The circuit 1804, as configured, serves to boost battery voltage in emergency mode for illuminating LED(s).

Figure 19:
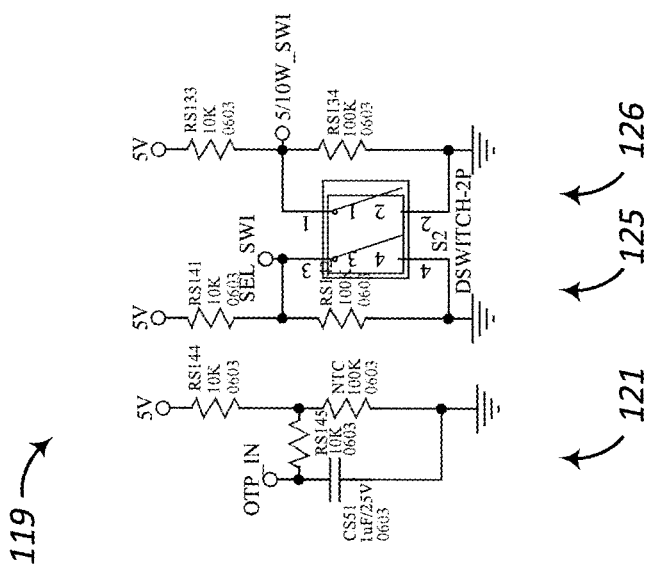
FIG. 19 shows a self-checking switch and circuit, an emergency power selection switch and circuit, and a temperature detection circuit.
Figure 21:
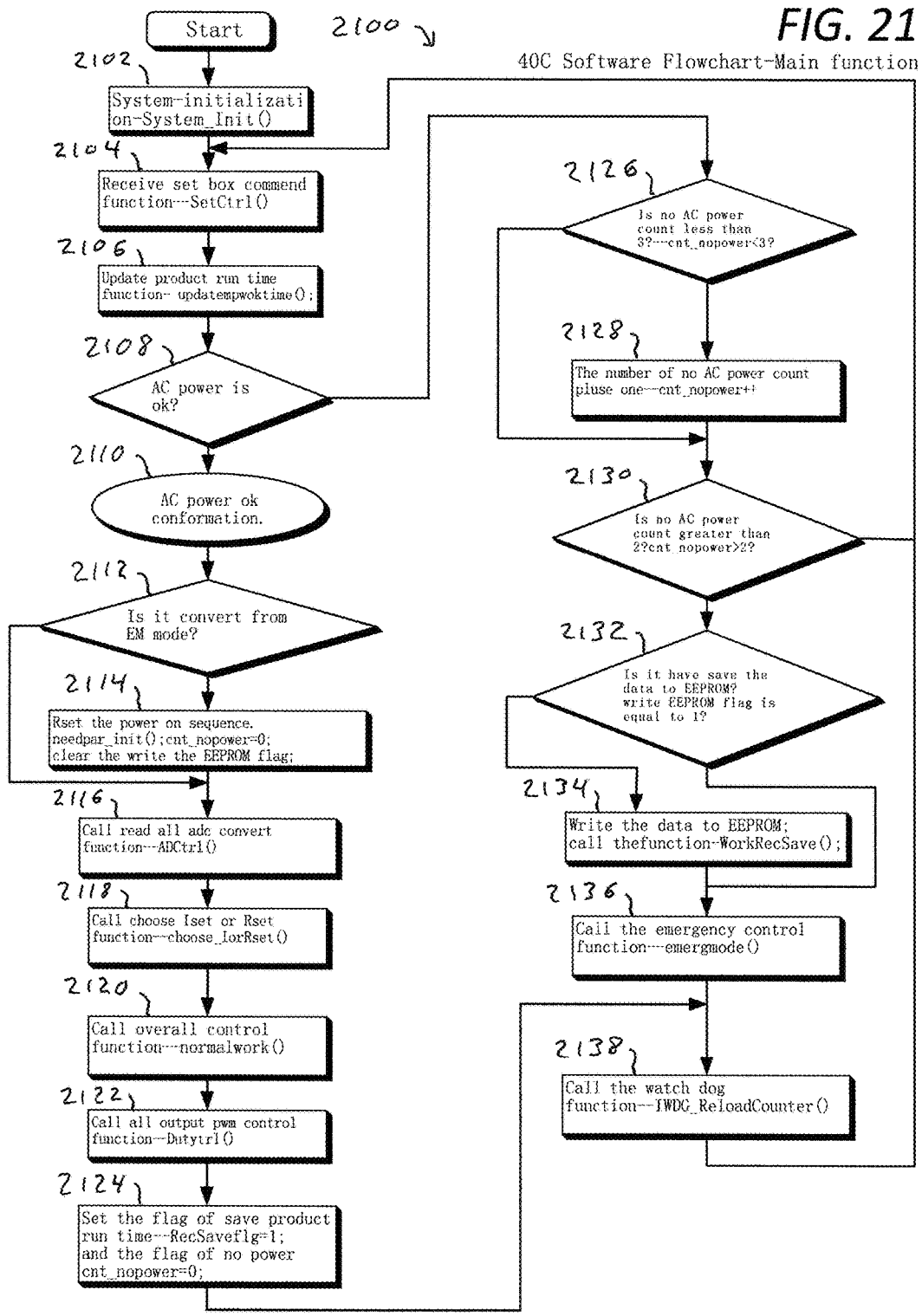
FIG. 21 is a flowchart showing a main function.
Figure 22A:
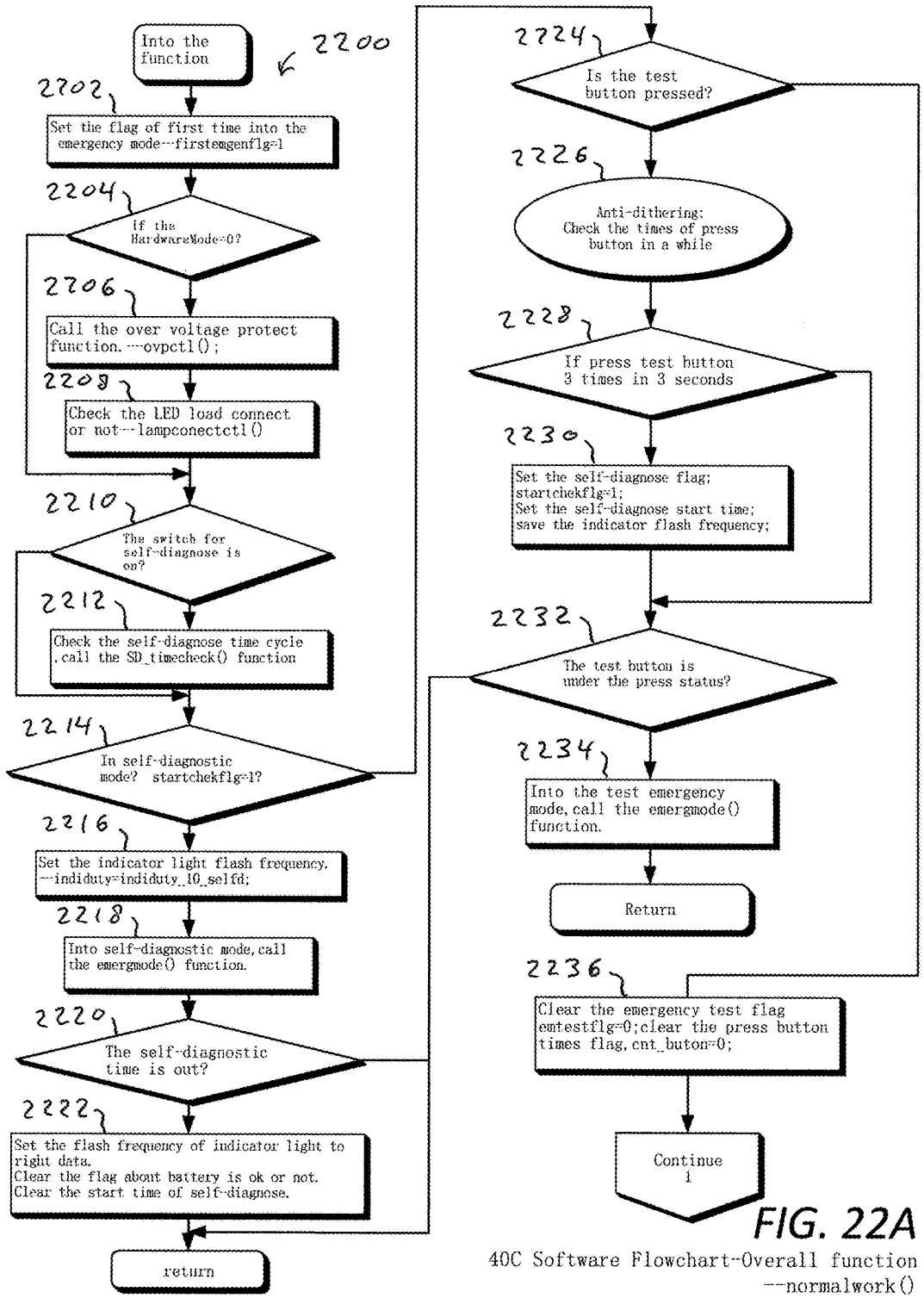
FIG. 22A is a flowchart showing normal overall function.
Figure 22B:
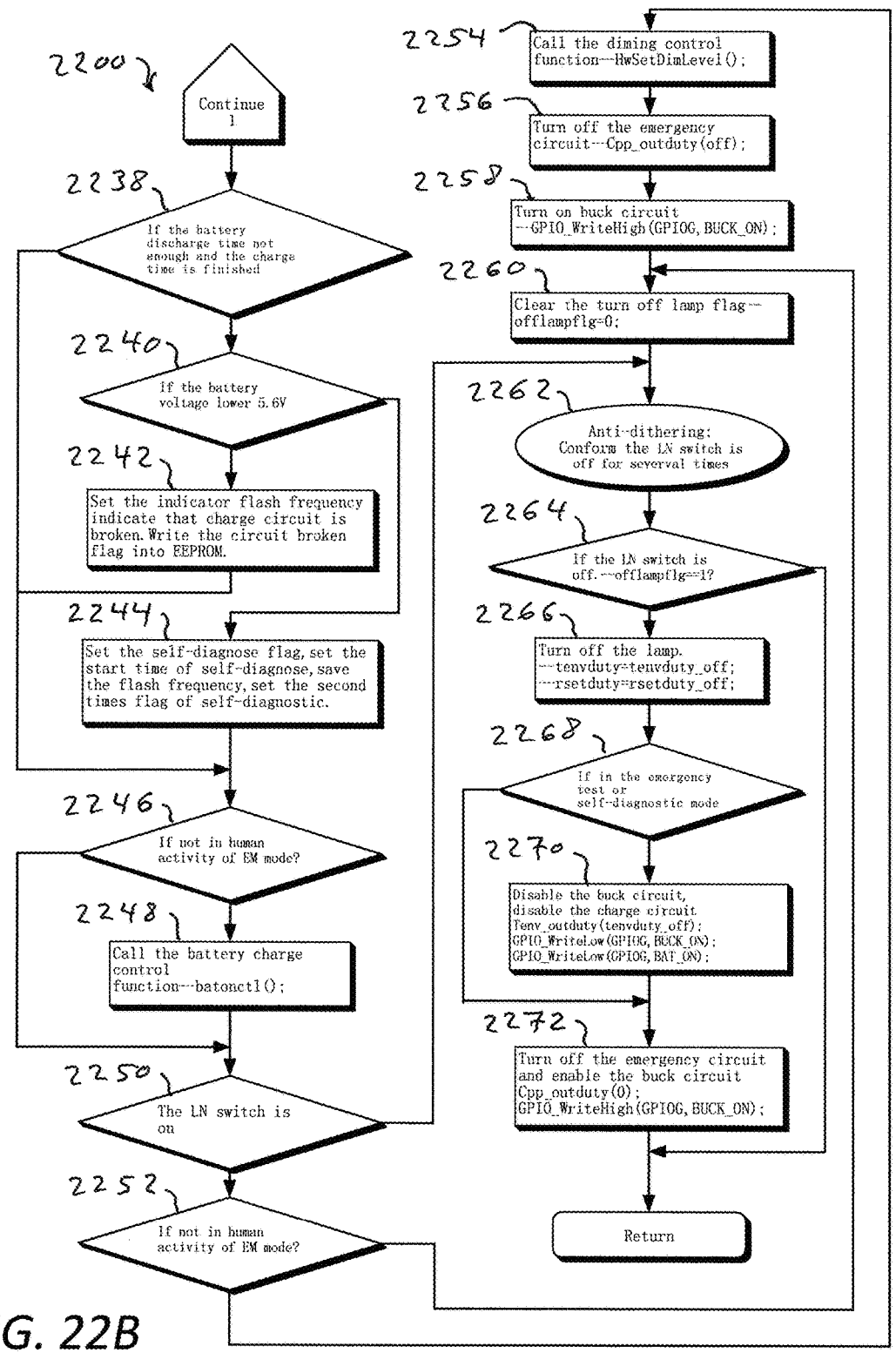
FIG. 22B is a flowchart showing normal overall function.

Referring to FIG. 19 (and also to FIG. 6), the circuit 119—which refers collectively to: self-checking switch and circuit 125; emergency power selection 5 W/10 W switch (for adjusting constant power output in EM mode) and circuit 126; and temperature detection circuit 121 to protect against over temperature—includes as nodes: SEL_SW1 (Enables or Disabled self-diagnostic features), 5/10 W_SW1 (Emergency 5/10 W selection button), OTP_IN (Temperature sensor input). Emergency power selection 5 W/10 W is effected by external switch, and output voltage and output current are detected for adjusting constant power output in emergency mode. In emergency mode, LED current is equal or lower than normal operation mode to avoid LED over current. By way of example, a self-diagnostic for light source and battery monitoring with user feedback is provided.

Figure 23A:
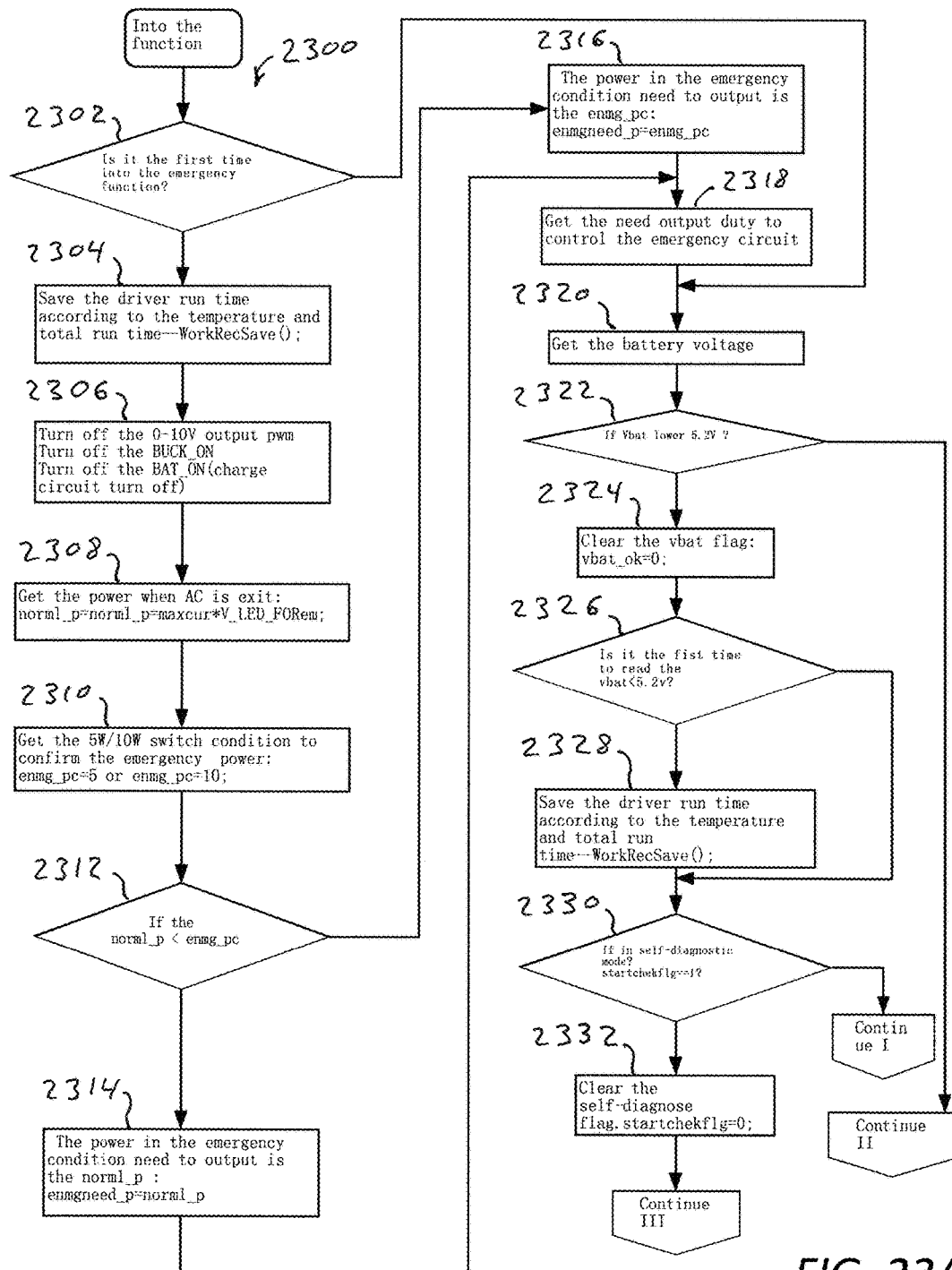
FIG. 23A is a flowchart showing an emergency control function.
Figure 23B:
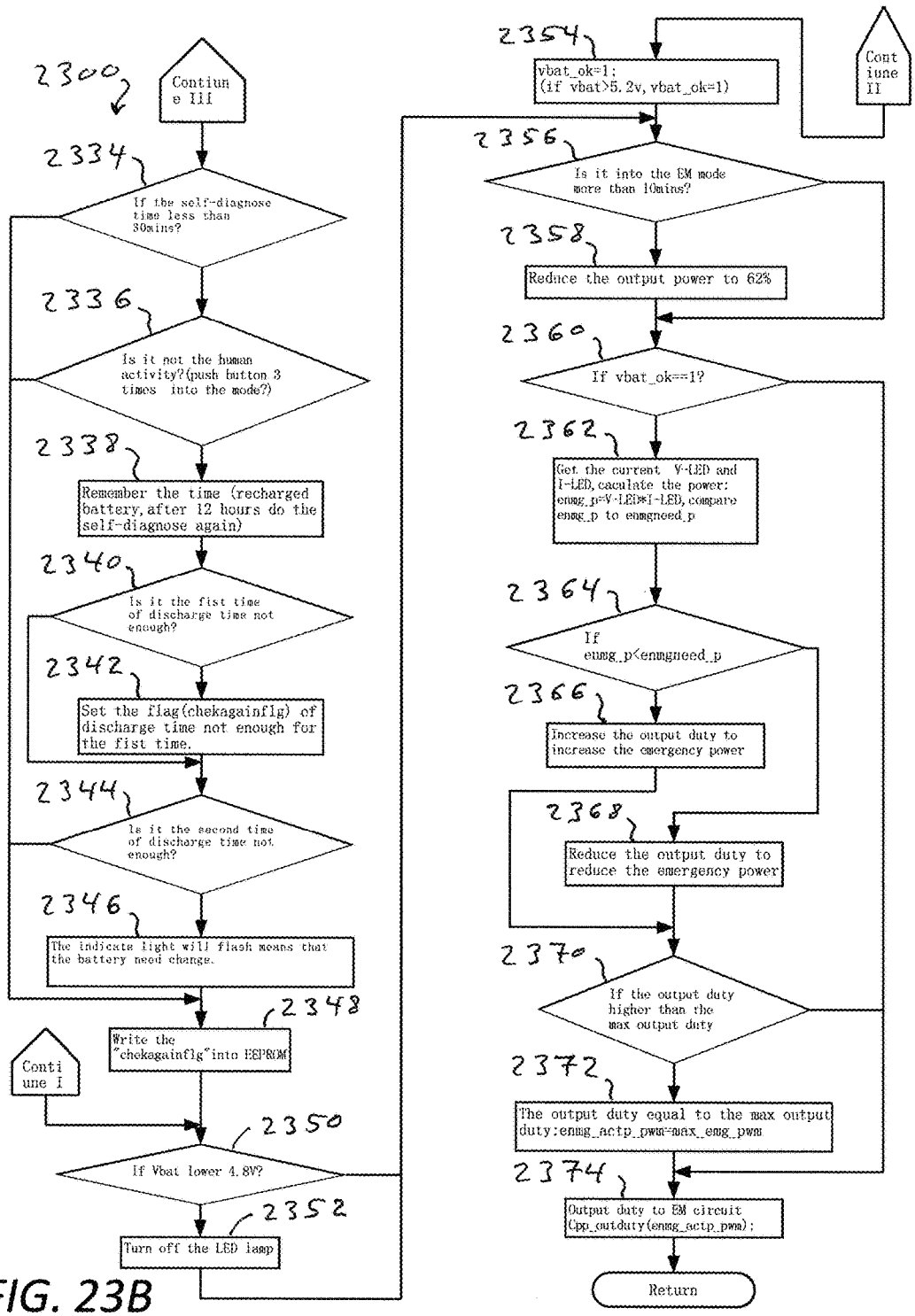
FIG. 23B is a flowchart showing an emergency control function.
Figure 23C:
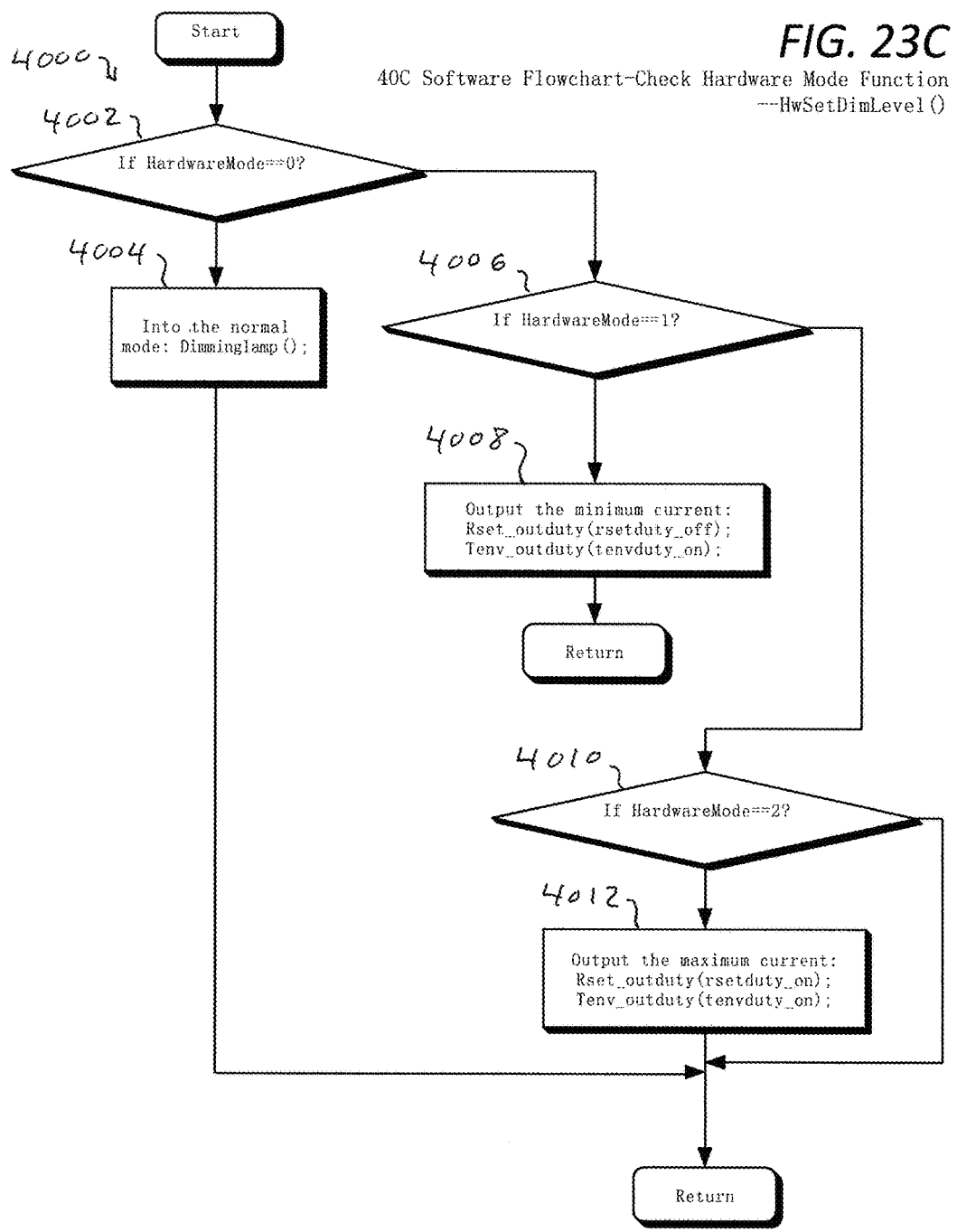
FIG. 23C is a flowchart showing check hardware mode function operation.
Figure 23D:
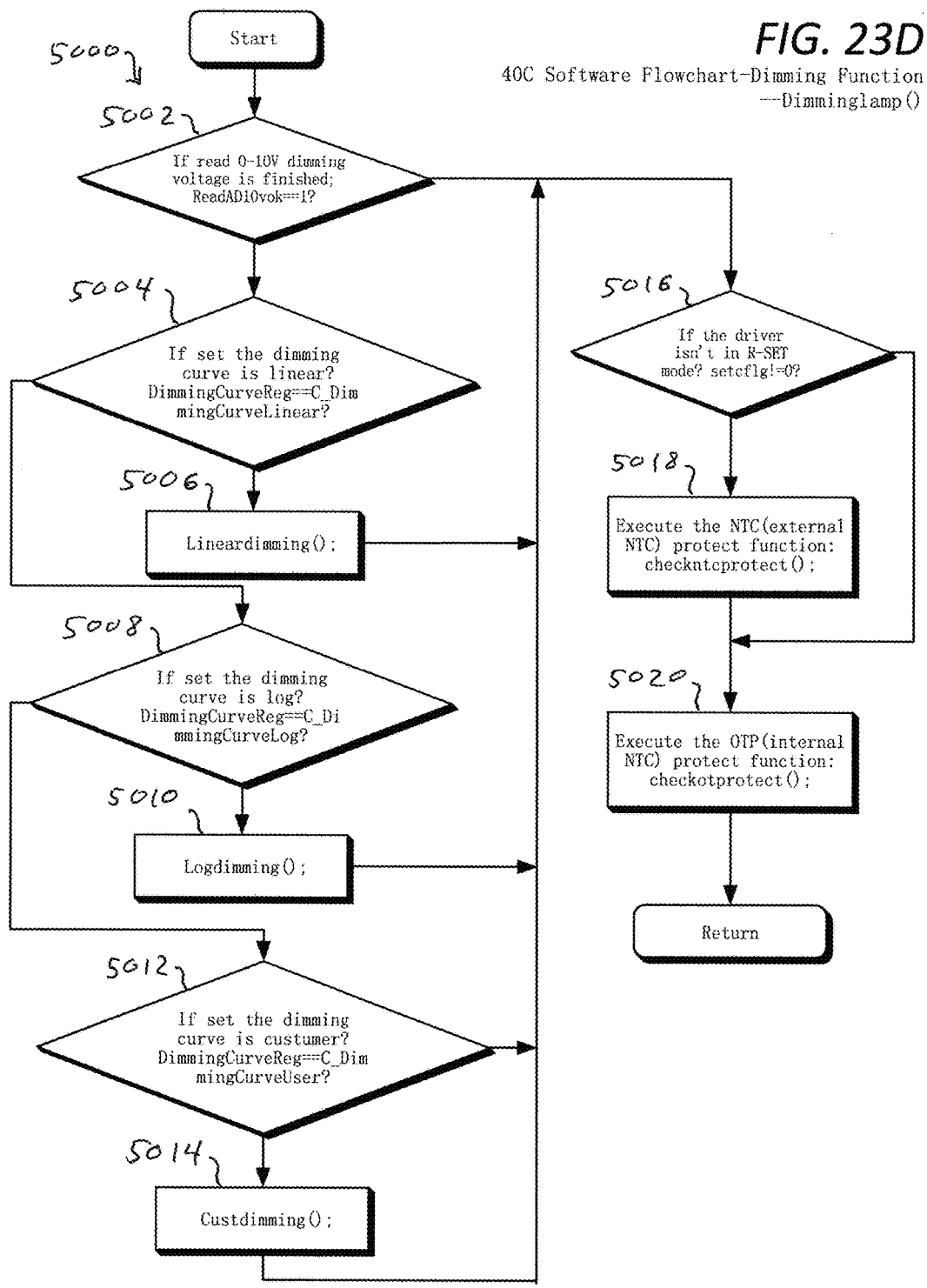
FIG. 23D is a flowchart showing dimming function operation.
Figure 23E:
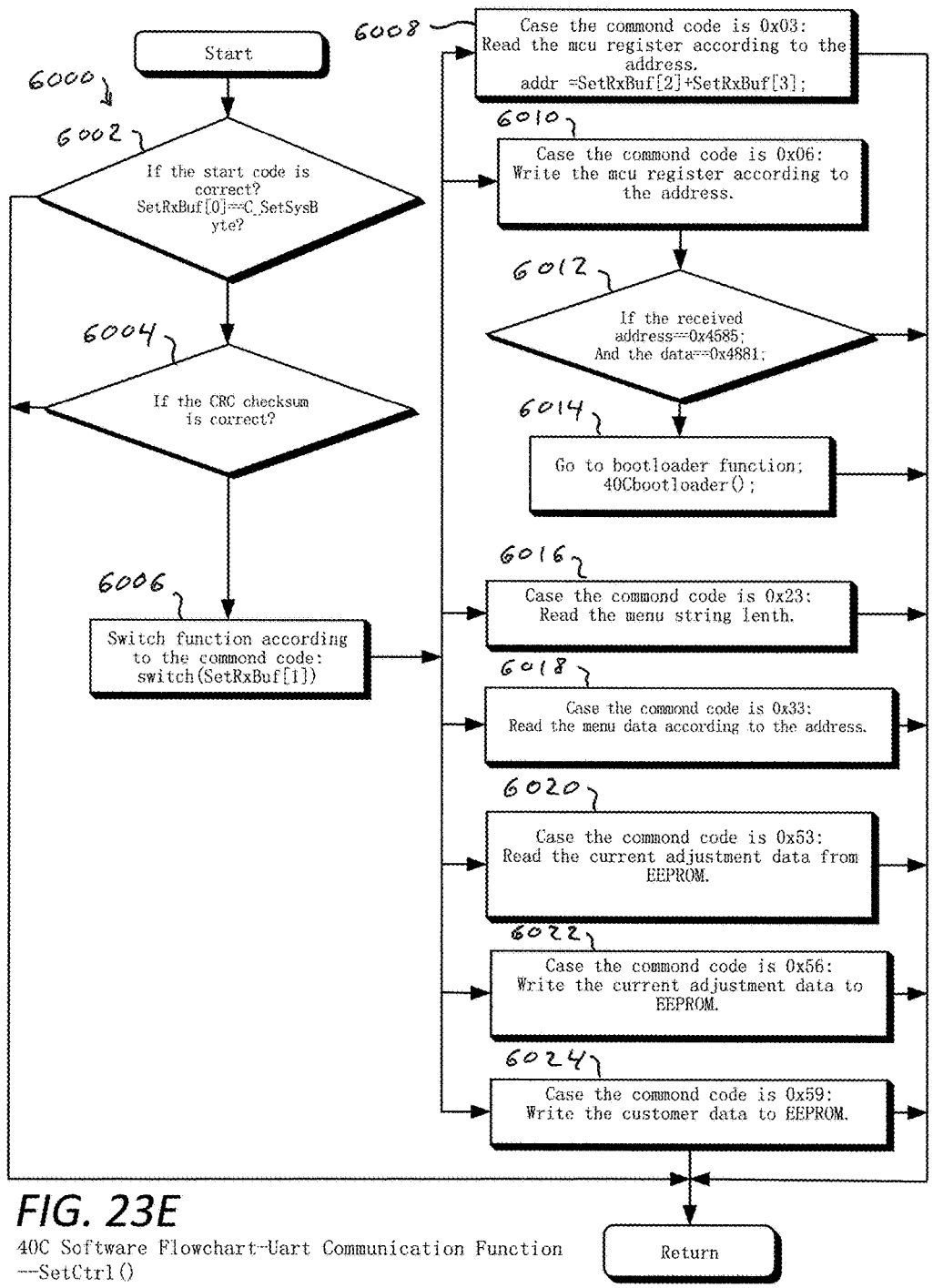
FIG. 23E is a flowchart showing UART communication function operation.
Figure 26C:
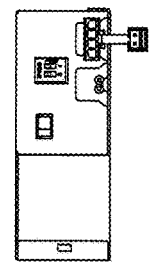
FIG. 26C is a front view of the LED driver/backup unit.
Figure 26B:
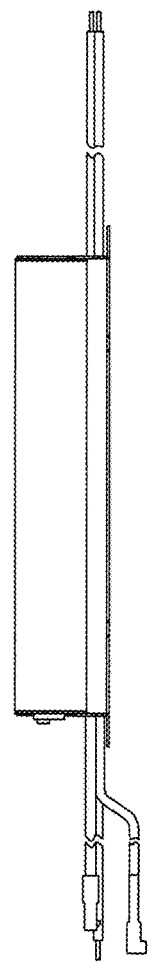
FIG. 26B is a side view of the LED driver/backup unit.
Figure 26D:
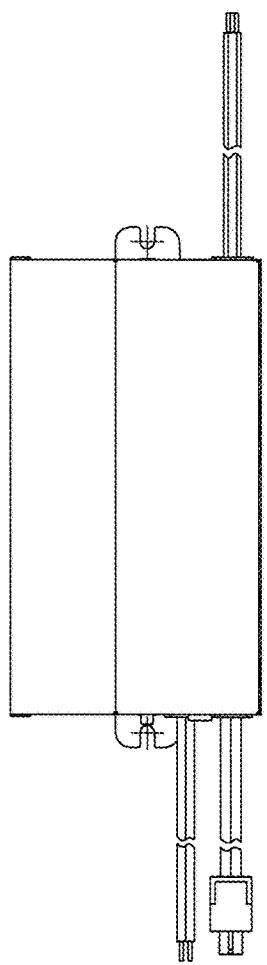
FIG. 26D is a top view of the LED driver/backup unit.
Figure 26A:
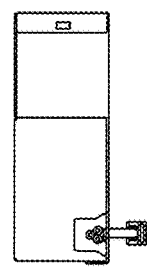
FIG. 26A is a back view of the LED driver/backup unit.
Figure 28A:
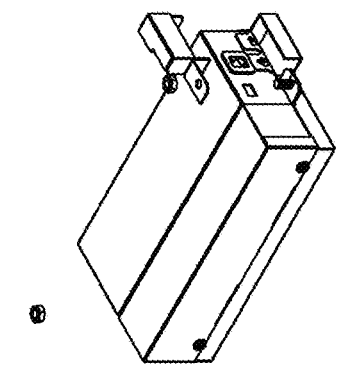
FIG. 28A illustrates a eighth step of a procedure for attaching a back side cover to the LED driver/backup unit.
Figure 28B:
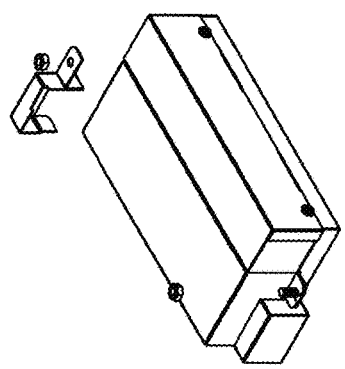
FIG. 28B illustrates a ninth step of a procedure for attaching a back side cover to the LED driver/backup unit.
Figure 28C:
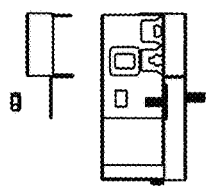
FIG. 28C illustrates a tenth step of a procedure for attaching a back side cover to the LED driver/backup unit.
Figure 28D:
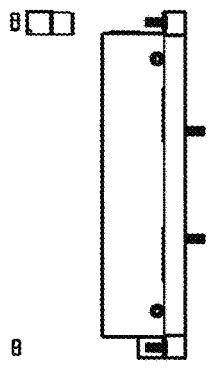
FIG. 28D illustrates a eleventh step of a procedure for attaching a back side cover to the LED driver/backup unit.
Figure 28E:
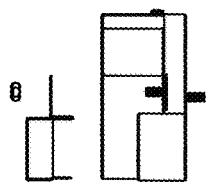
FIG. 28E illustrates a twelfth step of a procedure for attaching a back side cover to the LED driver/backup unit.
Figure 28F:
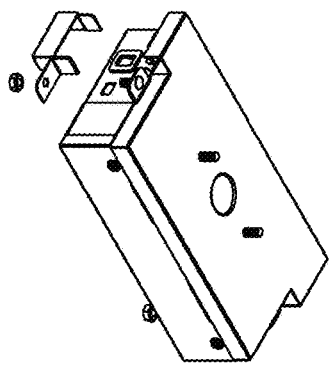
FIG. 28F illustrates a thirteenth step of a procedure for attaching a back side cover to the LED driver/backup unit.
Figure 28G:
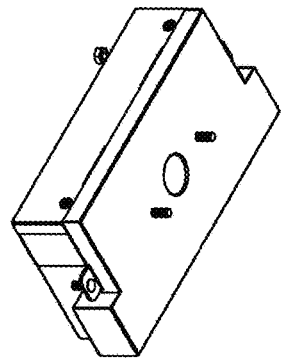
FIG. 28G illustrates a fourteenth step of a procedure for attaching a back side cover to the LED driver/backup unit.
Figure 30A:
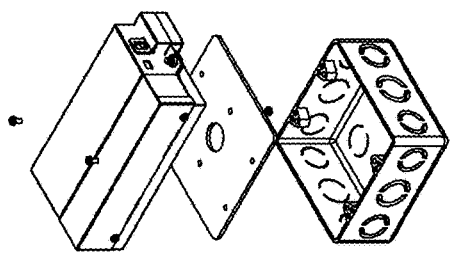
FIG. 30A illustrates a first step of a procedure for attaching the LED driver/backup unit and BLS cover to a junction box.
Figure 30B:
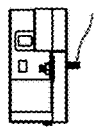
FIG. 30B illustrates a second step of a procedure for attaching the LED driver/backup unit and BLS cover to a junction box.
Figure 30C:
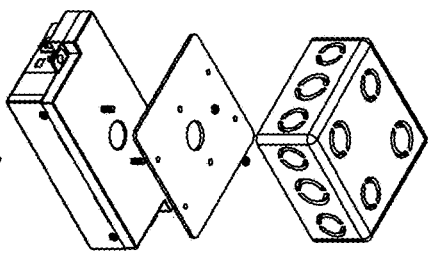
FIG. 30C illustrates a third step of a procedure for attaching the LED driver/backup unit and BLS cover to a junction box.
Figure 33A:
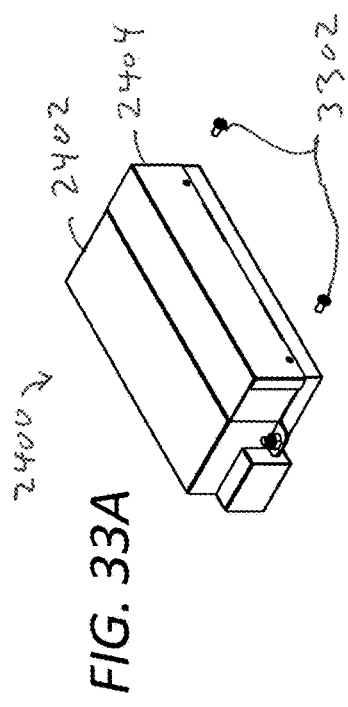
FIG. 33A illustrates a first step of a procedure for removing the cover to replace the battery.
Figure 33B:
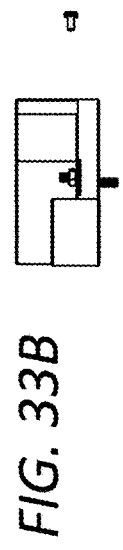
FIG. 33B illustrates a second step of a procedure for removing the cover to replace the battery.
Figure 33C:
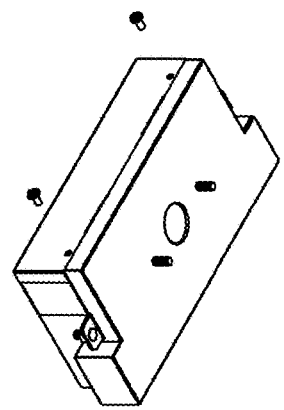
FIG. 33C illustrates a third step of a procedure for removing the cover to replace the battery.
Figure 34A:
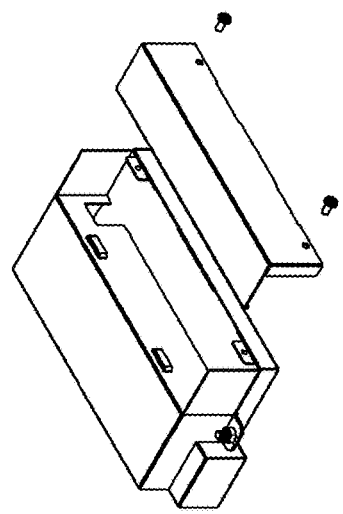
FIG. 34A illustrates a fourth step of a procedure for removing the cover to replace the battery.
Figure 34B:
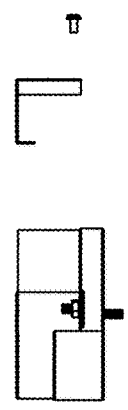
FIG. 34B illustrates a fifth step of a procedure for removing the cover to replace the battery.
Figure 34C:
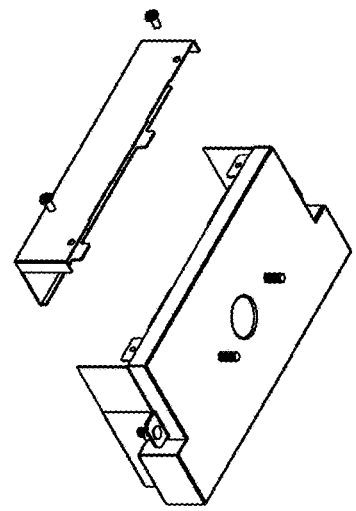
FIG. 34C illustrates a sixth step of a procedure for removing the cover to replace the battery.

FIGS. 21, 22A, 22B, 23A and 23B are flowcharts showing examples of main function, and normal and emergency modes of operation. FIGS. 23C, 23D and 23E are flowcharts showing examples of check hardware mode function operation (e.g., hardware set/selected minimum output current emergency mode or maximum output current emergency modes as shown in FIG. 23C), dimming function operation (e.g., applying, in normal mode, linear dimming curve, logarithmic dimming curve, or user/customer dimming curve as shown in FIG. 23D), and UART communication function operation (e.g., read/write according to command codes as shown in FIG. 23E), respectively. The functions/operations described herein inclusive of those depicted in FIGS. 21, 22A, 22B, 23A, 23B, 23C, 23D and 23E can be implemented in various ways including and/or utilizing processor(s) and/or controller(s), software, and firmware (e.g., hard coded in the firmware). Various dimming techniques and protocols can be implemented. Modes (or sub-modes) of operation can be provided (e.g., controlled by the MCU) and can include a ramp down LED power mode. By way of example, and referring also to FIGS. 23A and 23B, from 5.2V to 4.8V devices are controlled to begin to ramp down LED power. If the battery is still above 4.8V it will stay in ramp down mode. Output is dimmed at a selected speed to gradually reduce the light output, which provides a visual indicator (notice) that the battery is draining and the lights will be turned off soon. Example: from 100% light output to 62% to OFF.

Further with regard to the emergency power selection 5 W/10 W switch and circuit 126 (FIG. 19), the user input selection is provided (Dip switch PIN 1&2) on S2 to Input 5/10 W_SW1. In this example implementation, there are two targets of emergency operating mode, 5 W or 10 W. In this case (and based on the selected input), the duty cycle is adjusted to increase or reduced the power to match the target. The Target power can also be set via the programmer 230, same as Iset. With reference to FIG. 23B, the Duty cycle of the boost MOSFET is adjusted at steps 2366 and 2368 to achieve its target power. A protection function at step 2370 is also represented in this flowchart. A maximum duty cycle of 85%, for example, is set (e.g., hard coded in the firmware) for the boost MOSFET to protect it from damage. As the duty cycle is being increased to ramp up to the target power, it cannot exceed the max_emg_pwm setting before it is applied. If the duty cycle does exceed it, then it is set as max_emg_pwm. By way of example, when there is a need to increase the emgp_p duty cycle to match enmgneed_p target, but would require 86% duty cycle, the maximum for reliability reasons is 85%, the 86% command will be ignored and the duty will be set at 85% (max_emg_pwm).

Figure 20:
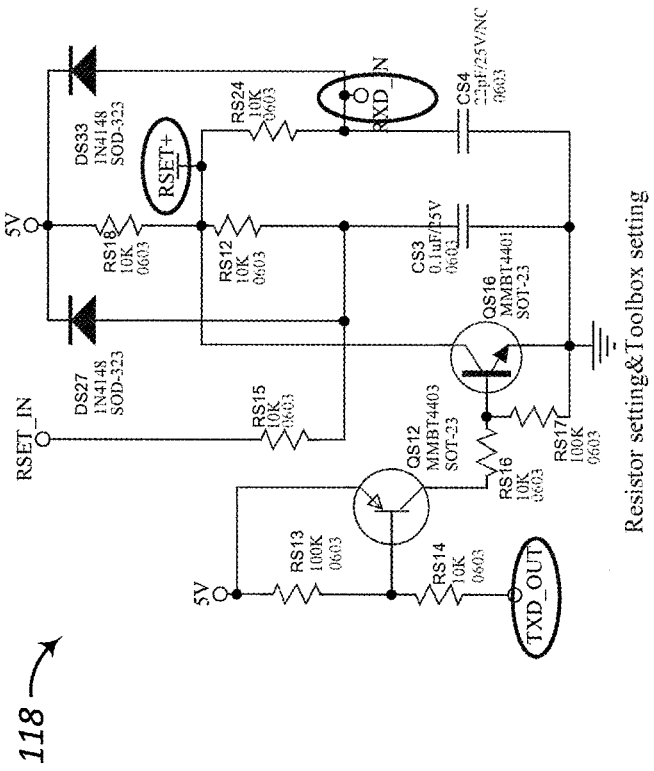
FIG. 20 shows a circuit that provides for user selectable constant power operation for emergency operation.

Referring to FIG. 20, the circuit 118 (output current setting circuit LED current from Rset or program box and dimming level and curve from program box circuit) facilitates (RXD_IN, TXD_OUT) a communication function with the MCU, and provides for user selectable (RSET+) constant power operation for emergency operation.

In relation to a "normal mode", the output current can be selected as follows: set by a resistor value on mating connector for CN1 Pin1 and Pin2; or set by the program box/setting box (Iset). When the driver has been programmed to provide a specific output current, the Rset value will be overridden. In example implementations, the programming determines if an Iset has been programmed in, if not the aforementioned setting will default to Rset. The current setting program box/setting box can be hand held programmer. Referring additionally to FIG. 24, in example implementations, the LED output current harness (resistor) port also services as a digital program port.

Example embodiments described herein relate to technologies and methodologies involving a programming/setting device that facilitates setting/selecting for a lighting device (e.g., a light fixture/luminaire such as a LED lamp) a final output current of the lighting driver or lighting driver unit that appropriately matched to a particular lighting device. For example, a lighting driver (unit) that is to be paired with a particular LED array can be conveniently set at the factory, allowing the light fixture/luminaire manufacturer or seller to fine-tune output current settings per seller or customer preferences or specifications, or to satisfy operational, performance, efficiency and/or other requirements or criteria.

In example embodiments and implementations, the lighting driver is configured to facilitate setting/selecting, via a user input or programming device, a final output current of the lighting driver responsive to or in relation to satisfying one or more operational, performance, efficiency or other requirement or criteria of the lighting device.

FIGS. 24-26D show a LED driver/backup unit that has an enclosure and removable battery cover portion. FIGS. 27A-29G illustrate a procedure for attaching a back side cover to the LED driver/backup unit. FIGS. 30A-32C illustrate a procedure for attaching the LED driver/backup unit and BLS cover to a junction box. FIGS. 33A-34C illustrate a procedure for removing the cover to replace the battery.

Example embodiments described herein relate to technologies and methodologies for providing a lighting driver or lighting driver unit that can be conveniently mounted at a location (e.g., at a junction box and/or driver unit mounting interface) separate from and/or remotely located in relation to a location (installation location/light fixture mounting interface) at which the lighting device (e.g., a light fixture) to be driven is (or will be) installed. In example embodiments and implementations, additionally or alternatively the lighting driver (unit) is sufficiently compact and configured to allow the lighting driver (unit) to be located within, or at least partially within, (a base or other portion of) the lighting device (e.g., a light fixture) once the lighting device is installed.

FIGS. 1A and 1B show examples of an LED driver and lighting device (e.g., light fixture including LED(s)) in non-collocated and collocated configurations, respectively. In FIG. 1B, the LED driver 200 and the lighting device 202 are mounted at mounting location Ml.

In example embodiments and implementations, the lighting driver (unit) is configured to be operatively connected to a power source (e.g., at a junction box) such that the lighting driver unit is not collocated with (and/or is remotely located in relation to) the lighting device (e.g., a light fixture).

In example embodiments and implementations, the lighting driver (unit) is configured to be mounted at a location (e.g., at a junction box and/or driver unit mounting interface)

separate from and/or remotely located in relation to a location (installation location/light fixture mounting interface) at which the lighting device (e.g., a light fixture) is installed.

In example embodiments and implementations, the lighting driver (unit) is configured to be mounted within, or at least partially within, (a base or other portion) the lighting device (e.g., a light fixture).

In example embodiments and implementations, the lighting driver (unit) has a height dimension no greater than 1.14" (e.g., 1 inch) and/or occupies a volume no greater than 19.4 cubic inches (e.g., suitable for installation within a 2'W× 2'L×1.15"H or smaller sized interior portion of a fixture).

In an example embodiment, a method of installing a lighting system includes the steps of: installing a lighting driver unit at a location (e.g., at a junction box and/or driver unit mounting interface) separate from and/or remotely located in relation to a location (installation location/light fixture mounting interface) at which a lighting device (e.g., a light fixture) is installed; and operatively connecting the lighting driver unit to the lighting device.

In an example embodiment, a method of installing a lighting system includes the steps of: installing a lighting driver (unit) at a location (e.g., at a junction box and/or driver unit mounting interface); and thereafter operatively connecting a lighting device (e.g., a light fixture) to the lighting driver (unit) and installing the lighting device at said location (e.g., as collocated or substantially collocated components of the lighting system). In example embodiments and implementations, the lighting driver (unit) is located within, or at least partially within, (a base or other portion) the lighting device (e.g., a light fixture) once the lighting device is installed.

In an example embodiment, a method of providing a lighting system includes the steps of: installing a lighting driver (unit) and a lighting device (e.g., a light fixture), as components of the lighting system, at separate locations and/or mounting interfaces, respectively; and operatively interconnecting the lighting driver unit and the lighting device.

In an example embodiment, a method of providing a lighting system includes the steps of: installing a lighting driver (unit) at a location (e.g., at a junction box and/or driver unit mounting interface); and thereafter installing the lighting device at said location (e.g., as collocated or substantially collocated components of the lighting system) and operatively interconnecting the lighting driver unit and the lighting device. In example embodiments and implementations, the lighting driver (unit) is located within, or at least partially within, (a base or other portion) the lighting device (e.g., a light fixture) once the lighting device is installed.

Although the present invention(s) has(have) been described in terms of the example embodiments above, numerous modifications and/or additions to the above-described embodiments would be readily apparent to one skilled in the art. It is intended that the scope of the present invention(s) extend to all such modifications and/or additions.

What is claimed is:

1. A driver for a lighting device including at least one light emitting diode (LED), the driver comprising:
    a lighting driver configured to drive each LED of the lighting device in a first mode of operation when a primary power source is available and provided to the lighting driver and to control power output and/or LED current in a second mode of operation utilizing a secondary power source responsive to a detected or otherwise obtained condition or status associated with the lighting driver, wherein the second mode of operation includes selecting a target power among at least two target power levels via a programming interface at the secondary power source and adjusting power from the secondary power source to reach the selected target power.

2. The driver of claim 1, wherein the lighting driver includes a single instance of a LED driver or LED driver circuitry.

3. The driver of claim 1, wherein the first mode of operation is or includes a normal, a standard, a default, or a primary mode of operation of the lighting driver.

4. The driver of claim 1, wherein the second mode of operation is or includes an emergency, a backup, a supplemental, an alternative, or a secondary mode of operation of the lighting driver.

5. The driver of claim 1, wherein the secondary power source is a battery.

6. The driver of claim 1, wherein the lighting driver is configured to facilitate setting/selecting, via the programming interface, a final output current of the lighting driver responsive to or in relation to satisfying one or more operational, performance, efficiency or other requirement or criteria of the lighting device.

7. The driver of claim 1, wherein said lighting device is a light fixture or luminaire that is to be paired with the lighting driver.

8. The driver of claim 1, wherein the lighting driver is configured with the programming interface that facilitates selecting the target power level to be utilized during the second mode of operation.

9. The driver of claim 1, wherein the lighting driver is configured to be mounted at a location separate from and/or remotely located in relation to a location at which the lighting device is installed.

10. The driver of claim 1, wherein the lighting driver of the lighting device is configured to be mounted within, or at least partially within, the lighting device.

11. The driver of claim 1, wherein the lighting driver has a height dimension no greater than 1.14" and/or occupies a volume no greater than 19.40 cubic inches.

12. A driver for a lighting device, the driver comprising:
    a lighting driver configured to drive one or more light emitting diodes (LEDs) of the lighting device in a normal mode of operation and to control power output and/or final output current of the lighting driver utilizing a backup or other power source during an emergency mode of operation, the lighting driver being configured to drive the one or more LEDs during both modes of operation, wherein the emergency mode of operation includes selecting a target power among at least two target power levels via a programming interface at the backup or other power source and adjusting power from the backup or other power source to reach the selected target power, the target power selected via a programming interface.

13. A driver for a lighting device, the driver comprising:
    a light emitting diode (LED) driver configured to drive one or more LEDs that are operatively connected to the LED Driver in a normal mode of operation and also using an emergency mode of operation, wherein the emergency mode of operation includes selecting a target power among at least two target power levels via a programming interface at a backup power source and adjusting power from the backup power source to reach the selected target power.

14. The driver of claim 13, wherein the LED driver is part of a LED driver/emergency battery pack device.

15. The driver of claim 13, wherein the LED driver is configured with the programming interface that facilitates selecting the target power level to be utilized during the emergency mode of operation.

16. The driver of claim 13, wherein the LED driver is configured to implement a pulse width modulation (PWM) technique or protocol of dimming output current of the LED driver.

* * * * *